US010691449B2

(12) United States Patent
Iwanir et al.

(10) Patent No.: US 10,691,449 B2
(45) Date of Patent: Jun. 23, 2020

(54) INTELLIGENT AUTOMATIC MERGING OF SOURCE CONTROL QUEUE ITEMS

(71) Applicant: Microsoft Technology Licensing, LLC, Redmond, WA (US)

(72) Inventors: Elad Iwanir, Metar (IL); Gal Tamir, Avichayil (IL); Mario A. Rodriguez, Raleigh, NC (US); Chen Lahav, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 140 days.

(21) Appl. No.: 15/499,702

(22) Filed: Apr. 27, 2017

(65) Prior Publication Data
US 2018/0314517 A1 Nov. 1, 2018

(51) Int. Cl.
*G06F 9/44* (2018.01)
*G06F 8/71* (2018.01)
*G06F 11/36* (2006.01)

(52) U.S. Cl.
CPC ............ *G06F 8/71* (2013.01); *G06F 11/3668* (2013.01)

(58) Field of Classification Search
CPC ................... G06F 8/20–78; G06F 11/34–3696
See application file for complete search history.

(56) References Cited

U.S. PATENT DOCUMENTS

| 6,389,433 | B1 | 5/2002 | Bolosky et al. | |
|---|---|---|---|---|
| 6,490,496 | B1 * | 12/2002 | Dacey | B29C 64/112 700/118 |
| 7,559,062 | B2 | 7/2009 | Code et al. | |
| 8,281,288 | B1 * | 10/2012 | Spencer | G06F 8/20 709/201 |
| 8,572,622 | B2 | 10/2013 | Alexander et al. | |
| 8,677,118 | B1 * | 3/2014 | Liu | G06F 21/56 709/219 |
| 8,677,348 | B1 * | 3/2014 | Ramanathpura | G06F 8/65 717/175 |
| 8,887,163 | B2 | 11/2014 | Rastogi | |

(Continued)

OTHER PUBLICATIONS

Meier, et al., "Defining Your Branching and Merging Strategy", https://msdn.microsoft.com/en-us/library/bb668955.aspx, Published on: Sep. 2007, 8 pages.

*Primary Examiner* — Adam Lee
(74) *Attorney, Agent, or Firm* — Fiala & Weaver P.L.L.C.

(57) ABSTRACT

Methods for intelligent automatic merging of source control queue items are performed by systems and apparatuses. Project changes are submitted in build requests to a gated check-in build queue requiring successful builds to commit changes to a code repository according to source control. Multiple pending build requests in the build queue are intelligently and automatically merged into a single, pending merged request based on risk factor values associated with the build requests. For merged requests successfully built, files in the build requests are committed and the build requests are removed from the queue. Merged requests unsuccessfully built are divided into equal subsets based on updated risk factor values using information from the unsuccessful build. Successful builds of subsets allow for committing of files and removal from the build queue, while unsuccessful builds are further divided and processed until single build requests are processed to identify root cause errors.

20 Claims, 8 Drawing Sheets

| | Build Req ID | Status | Developer | Priority |
|---|---|---|---|---|
| 402 | 1 | Running | Dev 1 | Normal |
| 702 | 2,3,5,6 | Pending | System | Normal |
| 404 | 2 | Pending | Dev 2 | Normal |
| 406 | 3 | Pending | Dev 3 | Low |
| 408 | 4 | Pending | Dev 1 | Normal |
| 410 | 5 | Pending | Dev 4 | Normal |
| 412 | 6 | Pending | Dev 1 | High |

700

(56) References Cited

U.S. PATENT DOCUMENTS

| | | | |
|---|---|---|---|
| 9,513,962 B2* | 12/2016 | Chen | G06F 9/4856 |
| 2004/0083450 A1* | 4/2004 | Porkka | G06F 8/20 |
| | | | 717/103 |
| 2005/0289505 A1* | 12/2005 | Williams | G06F 9/485 |
| | | | 717/103 |
| 2006/0041606 A1* | 2/2006 | Sawdon | G06F 16/31 |
| 2007/0168955 A1* | 7/2007 | Nicol | G06F 8/71 |
| | | | 717/120 |
| 2007/0234320 A1* | 10/2007 | Gu | G06F 8/41 |
| | | | 717/140 |
| 2008/0103797 A1* | 5/2008 | Holden | G06Q 10/06 |
| | | | 705/300 |
| 2008/0309665 A1* | 12/2008 | Gregory, II | G06F 17/50 |
| | | | 345/420 |
| 2009/0241118 A1 | 9/2009 | Lingamneni | |
| 2009/0282409 A1 | 11/2009 | Bartoy et al. | |
| 2011/0004867 A1* | 1/2011 | Holden | G06F 11/3676 |
| | | | 717/127 |
| 2011/0161944 A1 | 6/2011 | Cho et al. | |
| 2012/0311606 A1* | 12/2012 | Marathe | G06F 9/526 |
| | | | 718/107 |
| 2013/0014083 A1* | 1/2013 | Martineau | G06F 8/71 |
| | | | 717/122 |
| 2013/0247054 A1 | 9/2013 | Schmit et al. | |
| 2013/0346946 A1* | 12/2013 | Pinnix | G06F 8/71 |
| | | | 717/124 |
| 2014/0053135 A1* | 2/2014 | Bird | G06F 8/71 |
| | | | 717/124 |
| 2014/0081689 A1 | 3/2014 | Steiner et al. | |
| 2015/0154047 A1* | 6/2015 | Chen | G06F 9/4856 |
| | | | 718/103 |
| 2016/0034270 A1* | 2/2016 | Swierc | G06F 11/3668 |
| | | | 717/126 |
| 2016/0306618 A1* | 10/2016 | Bansod | G06F 8/65 |
| 2017/0123768 A1* | 5/2017 | Liu | G06F 8/60 |
| 2017/0147338 A1* | 5/2017 | Jackson | G06F 11/36 |

* cited by examiner

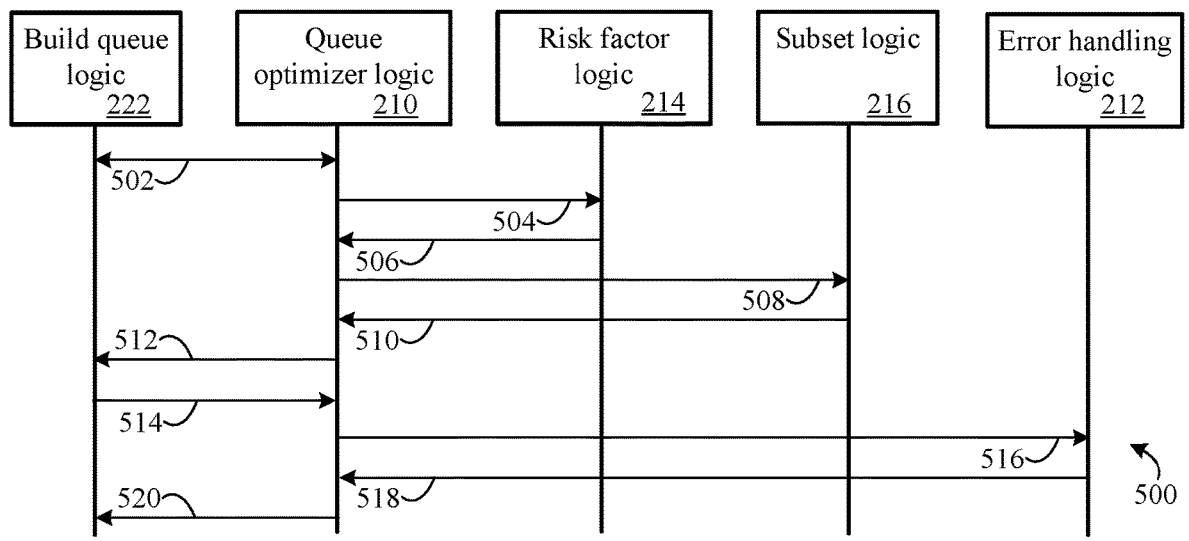
FIG. 5
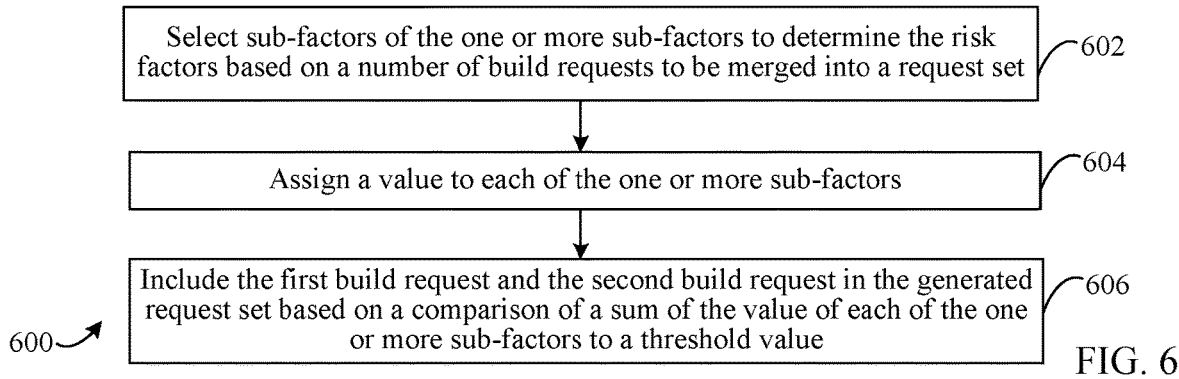
FIG. 6
| | Build Req ID | Status | Developer | Priority |
|---|---|---|---|---|
| 402 | 1 | Running | Dev 1 | Normal |
| 702 | 2,3,5,6 | Pending | System | Normal |
| 404 | 2 | Pending | Dev 2 | Normal |
| 406 | 3 | Pending | Dev 3 | Low |
| 408 | 4 | Pending | Dev 1 | Normal |
| 410 | 5 | Pending | Dev 4 | Normal |
| 412 | 6 | Pending | Dev 1 | High |
700
FIG. 7

| | Build Req ID | Status | Developer | Priority |
|---|---|---|---|---|
| 902 | 2,3,5,6 | Running | System | Normal |
| 702 | 2 | Pending | Dev 2 | Normal |
| 404 | | Pending | | |

| | Build Req ID | Status | Developer | Priority |
|---|---|---|---|---|
| 904 | | | | |
| 908, 702 | 2,3,5,6 | Passed/ Failed | System | Normal |
| 404 | 2 | Pending | Dev 2 | Normal |

| | Build Req ID | Status | Developer | Priority |
|---|---|---|---|---|
| 906 | | | | |
| 408 | 4 | Running | Dev 1 | Normal |

900

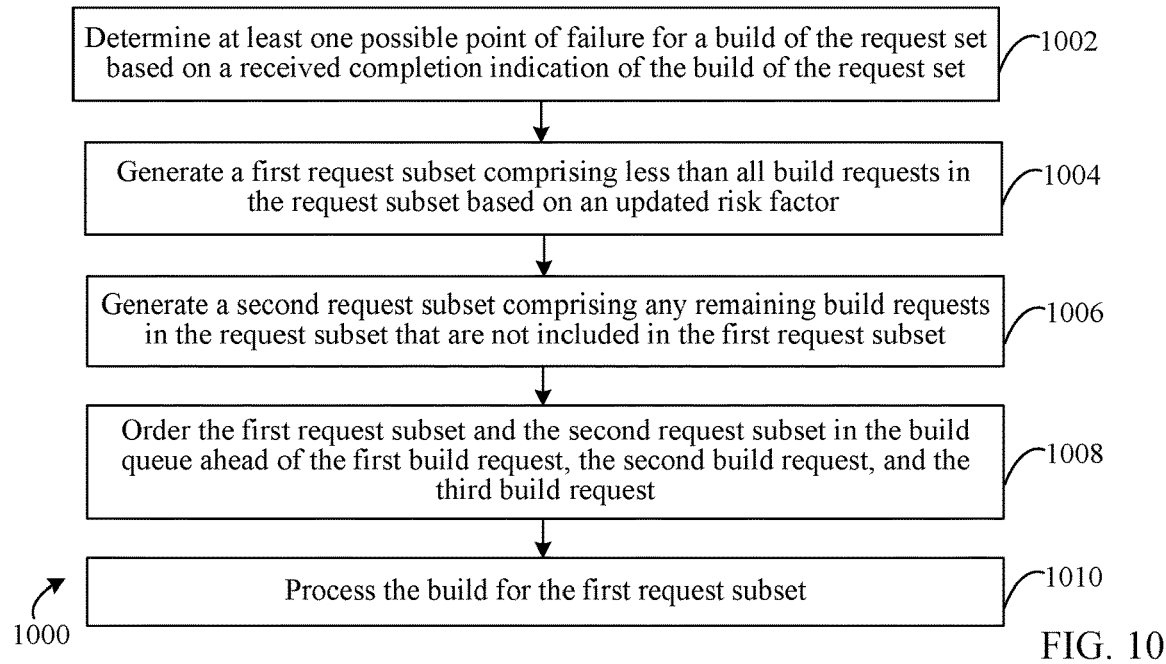
FIG. 10
FIG. 11
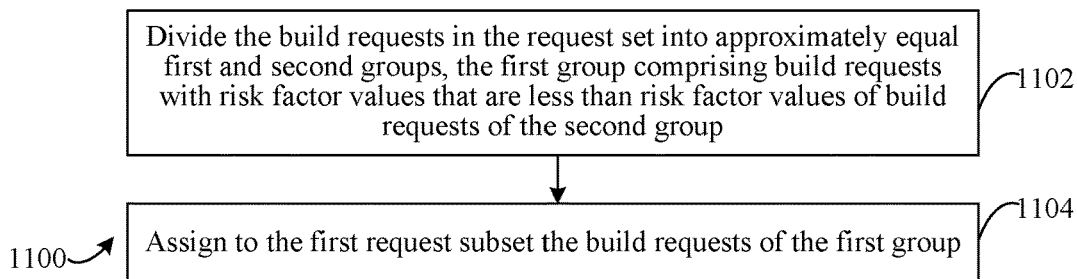
| | Build Req ID | Status | Developer | Priority |
|---|---|---|---|---|
| 1202 | 2,5 | Pending | System | Normal |
| 1204 | 3,6 | Pending | System | Normal |
| 404 | 2 | Pending | Dev 2 | Normal |
| 406 | 3 | Pending | Dev 3 | Low |
| 408 | 4 | Pending | Dev 1 | Normal |
| 410 | 5 | Pending | Dev 4 | Normal |
| 412 | 6 | Pending | Dev 1 | High |
FIG. 12

| Build Req ID | Status | Developer | Priority |
|---|---|---|---|
| 3, 6 | Running | System | Normal |
| 3 | Pending | Dev 3 | Low |
| 4 | Pending | Dev 1 | Normal |
| 6 | Pending | Dev 1 | High |

| Build Req ID | Status | Developer | Priority |
|---|---|---|---|
| 3 | Running | Dev 3 | Low |
| 4 | Pending | Dev 1 | Normal |
| 6 | Pending | Dev 1 | High |

INTELLIGENT AUTOMATIC MERGING OF SOURCE CONTROL QUEUE ITEMS

BACKGROUND

Project designers, such as software developers, hardware designers, etc., use design environments that include source control features. Source control provides a mechanism by which a designer or developer submits changes to portions of a project, such as source code, design code, media/multimedia objects, etc., and the changes may be "committed" to a central repository (e.g., added to the repository as the latest changes to that part of the source code) for the project upon successful completion of a build. A build may include performing compilation of code, unit/baseline tests, and/or the like, that are used to determine if errors or incompatibilities are present in the changes that would adversely affect the project. This type of source control acts as a gated check-in mechanism.

A build queue for these build requests is often used to govern the gated check-in decision. When a build request is submitted, it is placed in the build queue for processing of a build for the new or changed portions of the project. In larger projects, multiple build requests may be pending in the build queue waiting for verification of the build request at the head of the build queue to be performed. Upon completion of the build request at the head of the build queue, the next build request in the build queue is processed while the build requests below it remain pending, and so on. In such cases, a build request near the bottom of the build queue must wait for each build request above it before it is processed.

SUMMARY

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

Methods, systems, and apparatuses for intelligently and automatically merging source control queue items are described. For example, methods may be performed in server computers and/or computing devices from which a developer's computing device provides a build request to a build queue of a source control environment that includes a code repository for storing versions of a project. In one example, a computer-implemented method includes receiving a first build request for a build of a first code revision and a second build request for a build of a second code revision in a build queue associated with a code repository, and determining a risk factor associated with at least one of the first build request or the second build request. A request set is generated that comprises one or more of the first build request and the second build request based on the risk factor. As used herein, a request set is a set of build requests formed according to the intelligent, automatic merging of source control queue items described in the techniques and embodiments of this disclosure. The computer-implemented method also includes ordering the request set in the build queue as a third build request that is pending ahead of the first build request and the second build request. In some examples, the computer-implemented method may be performed based on program instructions recorded on a computer-readable storage device that, when executed by one or more processors, cause the one or more processors to perform the method in a client device.

In another example, a system is described. The system may include at least one first memory device configured to store program instructions, and at least one second memory device configured as a code repository. The system may also include at least one processor configured to execute the program instructions. In the example system, the program instructions include build queue instructions configured to maintain a build queue to queue received build requests and request sets, the build queue being a gated check-in build queue for access to the code repository, to order the request sets in the build queue ahead of pending build requests included in the request sets, and to commit code revisions of the build requests and the request sets for which a build successfully completes. The program instructions also include risk factor instructions configured to determine risk factors of the build requests that are received by the system, subset instructions configured to generate request sets and request subsets, each having one or more build requests pending in the build queue that are merged to form the request sets and subsets, based on the risk factors, and queue optimizer instructions to insert the request sets to the build queue.

These and other objects, advantages and features will become readily apparent in view of the following detailed description of examples of the invention. Note that the Brief Summary and Abstract sections may set forth one or more, but not all examples contemplated by the inventor(s). Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate examples of the present application and, together with the description, further serve to explain the principles of the example embodiments and to enable a person skilled in the pertinent art to make and use the example embodiments.

FIG. 5 shows a flow diagram for intelligently and automatically merging source control queue items by the host server of FIG. 2, according to an example embodiment.

FIG. 6 shows a flowchart for intelligently and automatically merging source control queue items, according to an example embodiment.

FIG. 7 shows a build queue with build requests and a request set, according to an example embodiment.

FIG. 10 shows a flowchart for intelligently and automatically merging source control queue items, according to an example embodiment.

FIG. 11 shows a flowchart for intelligently and automatically merging source control queue items, according to an example embodiment.

FIG. 12 shows a build queue with build requests and request subsets, according to an example embodiment.

Figure 1:
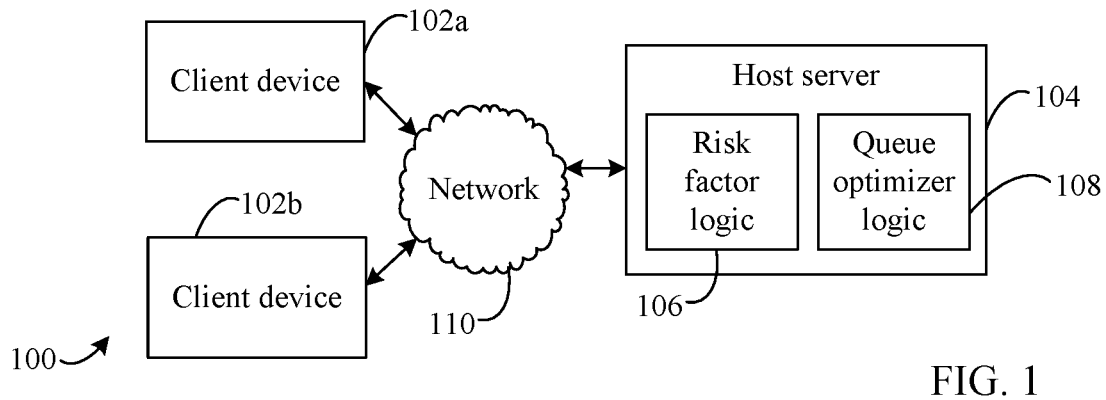
FIG. 1 shows a block diagram of a system for intelligently and automatically merging source control queue items, according to an example embodiment.

The features and advantages of the examples described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous examples. The scope of the present patent application is not limited to the disclosed examples, but also encompasses combinations of the disclosed examples, as well as modifications to the disclosed examples.

References in the specification to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to effect such feature, structure, or characteristic in connection with other examples whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous examples are described as follows. It is noted that any section/subsection headings provided herein are not intended to be limiting. Examples are described throughout this document, and any type of example may be included under any section/subsection. Furthermore, examples disclosed in any section/subsection may be combined with any other examples described in the same section/subsection and/or a different section/subsection in any manner.

Section II below describes example embodiments for intelligent and automatic merging of source control queue items. In particular, sub-sections A and B of Section II describe example system and merging embodiments and error handling embodiments, respectively.

Section III below describes example cloud-based learning embodiments.

Section IV below describes an example processor-based computer system that may be used to implement features of the example described herein.

Section V below describes some additional examples.

Section VI provides some concluding remarks.

II. Example Embodiments

The example techniques and embodiments described herein are provided for illustrative purposes, and are not limiting. The examples described herein may be adapted to any type of electronic and/or processing device, as well as systems thereof. Further structural and operational examples, including modifications/alterations, will become apparent to persons skilled in the relevant art(s) from the teachings herein.

When software developers, hardware designers, etc., hereinafter "developers," add changes to portions of projects, such as projects under development, developers may add source code (e.g., program code, etc.), design code (e.g., code for designing processors, application-specific integrated circuits (ASICs), etc.), file libraries, media/multimedia objects like pictures, audio files, animations, movie files, and/or the like, to code repositories through a gated check-in mechanism such as a build queue of a development environment. A "code repository," as described herein, may be a storage for managing and maintaining source and/or design code, in addition to other files associated with projects such as media/multimedia files, library files, other files associated with project builds, and/or the like. In other words, a "code repository" may comprise a repository for managing and maintaining any code, files, content, etc., associated with a project.

For instance, a development project may use Visual Studio® Team Services or other elements of the Microsoft® Visual Studio® development suite provided by Microsoft Corporation of Redmond, Wash. Developers submit their build requests that include the changes to be added to the build queue, which may typically operate as a first-in/first-out (FIFO) queue. When many developers submit build requests while a first build request in the build queue is being built, these submitted build requests are left pending in the build queue and must wait for completion of build requests that are further ahead in the build queue before being processed, and this delay for processing may be significant (when a build request is "ahead", the build request ordered is in the build queue to be processed before another build request that is considered to be "behind" it).

However, changes to be added by one developer may have a low risk of overlapping the changes to be added by another developer based on one or more factors described herein. For instance, if one developer adds or changes an audio file or a user interface (UI) template to the project, and another developer adds or changes source code for transmitting data to a server host, any errors introduced by these additions/changes will likely not have an effect on each other—i.e., errors in these additions/changes will likely be mutually exclusive. Accordingly, performing a build that includes the additions/changes from both developers will have little chance of negatively impacting a root cause analysis for such a merged build if some of the additions/changes have errors that cause the build to not complete successfully and/or may have a higher likelihood of being a successful build. In some cases, developers themselves may represent a low risk of a merged build based on historical information such as experience, a number or ratio of successfully completed build requests, etc. Additionally, if this merged build does completes successfully, the build queue efficiency is increased by processing more than one build request at a time.

Conversely, additions/changes in two build requests may have a higher risk of failure due to one or more factors described herein. In embodiments, a determined risk factor may be too high for combining one or more build requests with other build requests.

Examples described herein enable flexible, yet robust, intelligent and automatic merging of source control queue items. The described embodiments and techniques provide for risk assessment associated with merging queued build requests of developers. For instance, when developers submit build requests to a build queue, a risk assessment is performed on pending build requests that are candidates for merging. Candidate build requests that meet, or are below, an acceptable risk level may be merged into a single build request that may be placed at the head of the build queue, i.e., next in the queue for processing. Individual build requests that are included in the merged build request remain pending in the build queue in their original order. As described in further detail below, if a merged build request fails to complete successfully, the merged build is recursively divided into subsets for processing until one or more root builds of failure are determined through processing a single build request. In embodiments, as described in further detail below, the division may be performed according to a binary search, e.g., a recursive binary search, of the build requests that are merged. On the other hand, if a merged build request or subset thereof completes its build successfully, the individual build requests that are included in the merged build request or a subset thereof are removed from the build queue.

Examples are described in the following subsections for merging of source control queue items. In the following description, persons that develop an application or software package, design hardware or systems, or otherwise use a gated check-in environment for a code store or code repository using the techniques described herein may be referred to as a "developer" (or a "user"). A "host server" as referred to herein comprises one or more server computers or computing devices that receive build requests from developers and perform the merging of source control queue items according to the described embodiments and techniques. Additionally, a device of a "developer" may be referred to as a "client system," a "client device," a "developer client," and/or the like.

A. Example System and Merging Embodiments

Systems and devices may be enabled in various ways for intelligent and automatic merging of source control queue items according to embodiments. For example, FIG. 1 is a block diagram of a system 100 system for intelligently and automatically merging source control queue items, according to an embodiment. As shown in FIG. 1, system 100 includes a client device 102a, a client device 102b, and a host server 104, which may communicate over a network 110. It should be noted that the number of client devices and host servers is exemplary in nature, and may include more or fewer of each in various embodiments.

Client device 102a, client device 102b, and host server 104 are configured to be communicatively coupled via network 110. Network 110 may comprise any type of connection(s) that connects computing devices and servers such as, but not limited to, the Internet, wired or wireless networks and portions thereof, point-to-point connections, local area networks, enterprise networks, and/or the like.

Client device 102a and client device 102b may be any type of computing device or terminal that may be used by a developer for creating code or content for projects under development, as described herein. Client device 102a and client device 102b are configured to provide access for developers to a development environment submit build requests to host server 104 over network 110.

Host server 104 may comprise one or more server computers and may be one or more distributed or "cloud-based" servers, for example. Host server 104 is configured to receive build requests from client device 102a and/or client device 102b via network 110. As illustrated, host server 104 includes risk factor logic 106 and queue optimizer logic 108.

Risk factor logic 106 is configured to determine risk factors associated with build requests from client device 102a and/or client device 102b, as well as risk factors associated with request sets and request subsets as described in further detail below. Queue optimizer logic 108 is configured to monitor a build queue and manage the generation and scheduling of merged queue items based, at least in part, on determined risk factors for build requests from risk factor logic 106. Host server 104 is configured to utilize risk factor logic 106 and queue optimizer logic 108 for intelligent and automatic merging of source control queue items.

Figure 2:
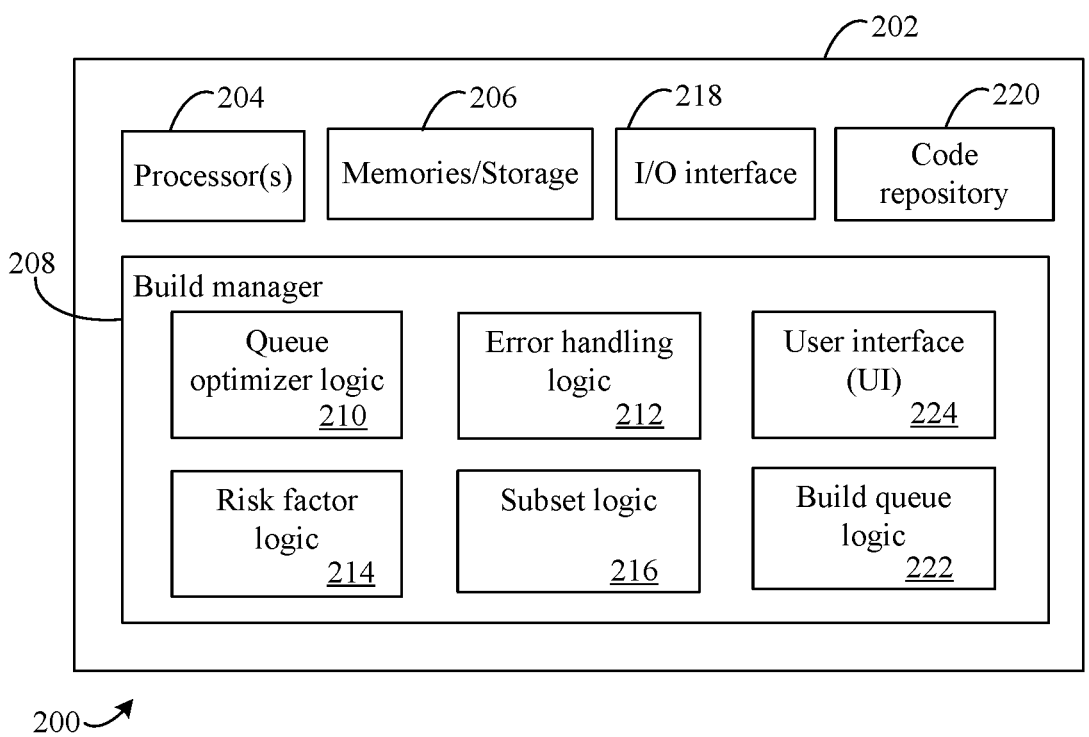
FIG. 2 shows a block diagram of the system shown in FIG. 1 having a host server, according to an example embodiment.

For instance, FIG. 2 is a block diagram of a system 200 for intelligent and automatic merging of source control queue items, according to an embodiment. As shown in FIG. 2, system 200 includes a host server 202. System 200 may be a further embodiment system 100 of FIG. 1, and host server 202 may be a further embodiment of host server 104 of FIG. 1. Host server 202 may be any type of server computer or computing device, as mentioned elsewhere herein, or as otherwise known. As shown in FIG. 2, host server 202 includes one or more of a processor 204, one or more of a memory and/or storage ("memory") 206, an input/output (I/O) interface 218, a code repository 220, and a build manager 208. System 200 may also include additional components (not shown for brevity and illustrative clarity) such as, but not limited to, those described below with respect to FIG. 18.

Processor 204 and memory 206 may respectively be any type of hardware/physical processor or memory that is described herein, or as would be understood by a person of skill in the relevant art(s) having the benefit of this disclosure. Processor 204 and memory 206 may each respectively comprise one or more processors or memories, different types of processors or memories, and/or distributed processors or memories. Processor 204 is configured to execute computer program instructions, e.g., for processing build requests, for merging build requests, for risk determinations, etc., as described herein, and memory 206 is configured to store such computer program instructions, as well as to store other documents and data described in this disclosure.

I/O interface 218 may be any type of wired and/or wireless network adapter, modem, etc., configured to allow host server 202 to communicate with other devices over a network, e.g., such as client device 102a and/or client device 102b described above with respect to FIG. 1.

While not shown for illustrative clarity, host server 202 may include an operating system (OS) that may be any operating system used by computing devices described herein such as, but without limitation, Microsoft® Windows® from Microsoft Corporation of Redmond, Wash., OS X® from Apple, Inc. of Cupertino, Calif., UNIX® from The Open Group, and/or the like. In embodiments, an OS may be accessed by a client device via a network connection to a server (e.g., host server 202) where such client devices operate as workstations or terminals.

Code repository 220 may comprise one or more memories or storage devices organized to perform source repository and/or revision control functions for development and/or design projects. For instance, code repository 220 may be configured to be associated with Visual Studio® Team Services provided by Microsoft Corporation of Redmond, Wash. In embodiments, code repository 220 may be a part of memory 206.

Build manager 208, as illustrated, includes a plurality of components for performing the techniques described herein for intelligent and automatic merging of source control queue items. As shown, build manager 208 includes queue optimizer logic 210 that may be an embodiment of queue optimizer logic 108 of FIG. 1, error handling logic 212, risk factor logic 214 that may be an embodiment of risk factor logic 106 of FIG. 1, subset logic 216, build queue logic 222, and a user interface (UI) 224. While shown separately for illustrative clarity, in embodiments, one or more of error handling logic 212 and risk factor logic 214 may be included together with each other and/or as a part of queue optimizer logic 210.

Figures 3, 4:
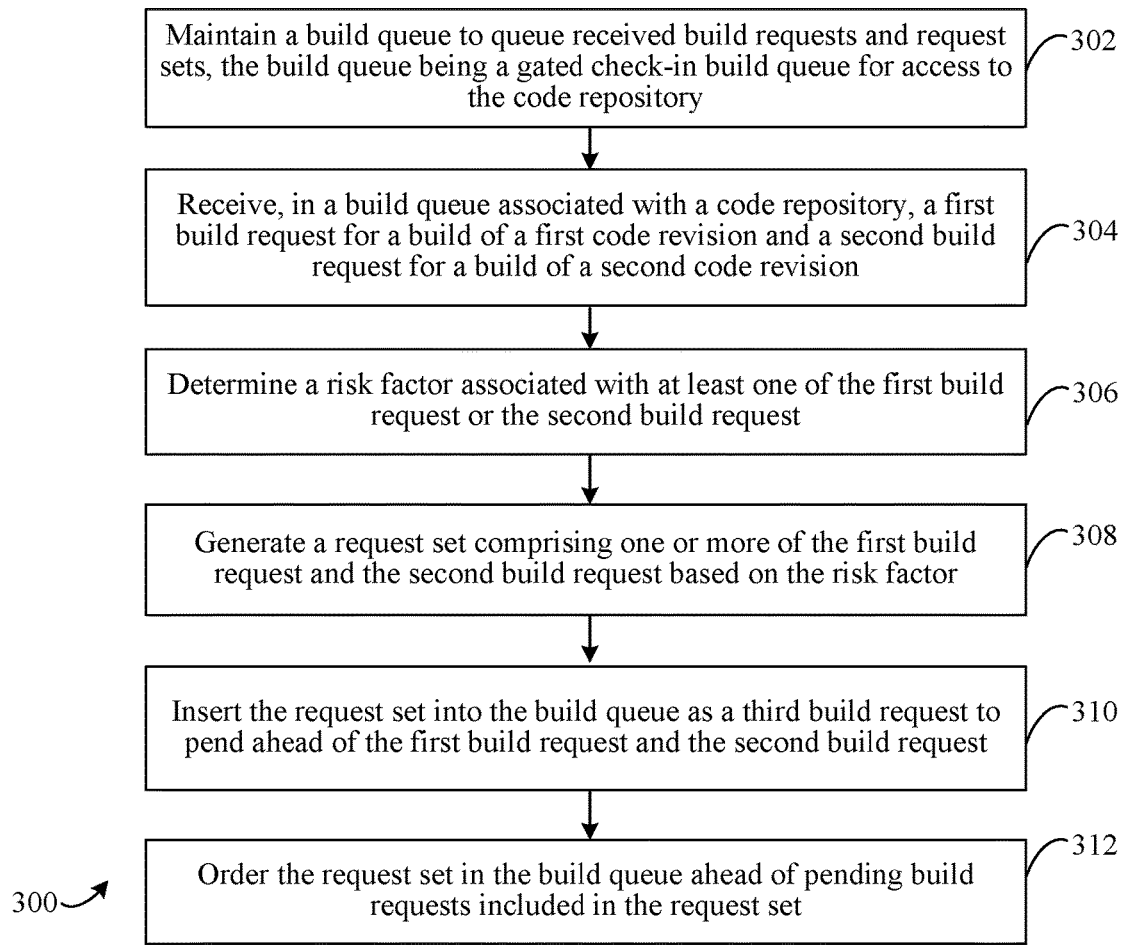
FIG. 3 shows a flowchart for intelligently and automatically merging source control queue items, according to an example embodiment.
FIG. 4 shows a build queue with build requests, according to an example embodiment.

Referring also to FIG. 3, a flowchart 300 for intelligently and automatically merging source control queue items is shown, according to an example embodiment. For purposes of illustration, flowchart 300 of FIG. 3 is described with respect to system 200 of FIG. 2 and its subcomponents, and also with reference to FIGS. 4 and 5. That is, host server 200 of FIG. 2 may perform various functions and operations in accordance with flowchart 300 for merging source control queue items in that client device 102a and/or client device 102b of system 100 in FIG. 1 may provide build requests to be queued and/or merged by build manager 208 of FIG. 2. Further structural and operational examples will be apparent to persons skilled in the relevant art(s) based on the following description. Flowchart 300 is described as follows.

In step 302, a build queue is maintained to queue received build requests and request sets, the build queue being a gated check-in build queue for access to the code repository. For example, build queue logic 222 may be loaded in memory 206 for execution by processor 204 to generate and/or maintain a build queue to queue received build requests and request sets, as described herein.

Referring also to FIG. 4, a build queue 400 with build requests is shown, according to an example embodiment. Build queue 400 is generated according to build queue logic 222 and may be configured to act as a gated check-in build queue for access to code repository 220 of FIG. 2. Build queue 400 is exemplary in nature for illustrative and discussion purposes, and is not considered to be limiting. As referred to below, when information, data, build requests, etc., are provided to a build queue, it is contemplated herein that this also means such provision is made to build queue logic 222. Additional components and information may be included in build queue 400, in various embodiments, such as but without limitation, time pending for build requests, project identifiers, project source versions and/or identifiers, etc. As noted above, developers may submit their build requests that include their project changes to build queue 400, which may typically operate as a FIFO queue. While a first build request in the build queue is being built, i.e., being processed, subsequently submitted build requests are left pending in build queue 400 and must wait for completion of build requests that are further ahead in build queue 400 before being processed. This waiting time may be significant in cases with many project developers and/or build requests.

For instance, build queue 400 exemplarily shows the following build requests included therein: a build request 402 having an identifier (ID) of 1, a status of "running" (i.e., build request 402 is being processed), a developer name "Dev1," and a priority of "Normal"; a build request 404 having an ID of 2, a status of "pending," a developer name "Dev2," and a priority of "Normal"; a build request 406 having an ID of 3, a status of "pending," a developer name "Dev3," and a priority of "Low"; a build request 408 having an ID of 4, a status of "pending," a developer name "Dev1," and a priority of "Normal"; a build request 410 having an ID of 5, a status of "pending," a developer name "Dev4," and a priority of "Normal"; and a build request 412 having an ID of 6, a status of "pending," a developer name "Dev1," and a priority of "High." As illustrated, the build request ID shown provides the order of submission of build requests, although other types of ID are contemplated herein. Because build request 402 is the oldest request (furthest ahead) of the pending requests shown in build queue 400 (i.e., is the first in), it is being processed (i.e., to be the first out), while the remaining build requests are pending.

Referring back to flowchart 300 of FIG. 3, in step 304, a first build request for a build of a first code revision and a second build request for a build of a second code revision are received in a build queue associated with a code repository. For instance, build requests may be received from client device 102a and/or client device 102b over network 110 by host server 202 using I/O interface 218. Received build requests may be stored in memory 206 and then provided to build queue 400, or may be provided directly to build queue 400. As a non-limiting example, build request 404 may be received by build queue 400 from client device 102a, and build request 406 may be received by build queue 400 from client device 102b. Build request 404 may include project changes made by Dev2 and build request 406 may include project changes made by Dev3 to be added to code repository 220. As shown, build request 404 is received and queued by build queue 400 prior to build request 406.

Referring also to FIG. 5, a flow diagram 500 for intelligently and automatically merging source control queue items by host server 200 of FIG. 2 is shown, according to an example embodiment. For instance, queue optimizer logic 210 of host server 200 is configured to inspect or interrogate build queue 400 to determine if merging of source control queue items should be performed at step 502. In some embodiments, build queue 400 may provide information about queued build requests to queue optimizer logic 210 without inspections/interrogations. Step 502 may be performed based on various criteria, e.g., as individual build requests are received by build queue 400, after a determined number of build requests are received by build queue 400 (e.g., exceeding a threshold of 1, 2, 3, 4, 5, . . . , etc., pending build requests), and/or the like.

Referring back to flowchart 300, in step 306, a risk factor associated with at least one of the first build request or the second build request is determined. Risk factor logic 214 is configured to determine one or more risk factors associated with any number of build requests in the build queue. For example, the first build request and the second build request of step 304 may be received by build queue 400. In the context of build queue 400 as illustrated in FIG. 4, the first build request may correspond to build request 404, and the second build request may correspond to build request 406, each of which are shown as pending in build queue 400. Queue optimizer logic 210 is configured to provide information associated with the received build requests, e.g., responsive to the criteria noted above, to risk factor logic 214 at step 504 of flow diagram 500 in FIG. 5. The provided information associated with a given, received build request may include, without limitation: an ID, a status, a developer name, a priority, a base commit of the change for a project, changed file types and/or the files themselves, an amount of code churn of the change for a project (e.g., how much is being changed or added), properties of changed or added content within a project (e.g., a directory or project portion in which the change is located), and/or the like. In some embodiments, risk factor logic 214 may determine one or more portions of the above information from other sources such as code repository 220, memory 206, etc.

Risk factor logic 214 is configured to determine risk sub-factors, i.e., individual factors, associated with any information related to build requests, as described herein, to determine overall risk factor values for build requests.

Referring also to FIG. 6, a flowchart 600 for intelligently and automatically merging source control queue items is shown, according to an example embodiment. For purposes of illustration, flowchart 600 of FIG. 6 is described with respect to system 200 of FIG. 2 and its subcomponents, e.g., risk factor logic 214 and subset logic 216, and also with reference to FIGS. 4 and 5. That is, host server 200 of FIG. 2 may perform various functions and operations in accordance with flowchart 600 for merging source control queue items in build queue 400 of FIG. 4. Further structural and operational examples will be apparent to persons skilled in the relevant art(s) based on the following description. Flowchart 600 is described as follows.

In step 602, sub-factors of the one or more sub-factors are selected to determine the risk factors based on a number of build requests to be merged into a request set. For instance, risk factor logic 214 is configured to select specific risk sub-factors to determine overall risk factor values. Risk factor logic 214 may be configured to select any number of available risk sub-factors to use for this determination, and in embodiments, the number of risk sub-factors and the specific risk sub-factors selected may be based on number of build requests to be merged into a request set. For example, in some embodiments, such as where a relatively large number of build requests are queued (e.g., 10, 20, 30, . . . , 100, etc., pending build requests), a subset of any of the sub-factors/individual risk factors described herein may be used to determine overall risk factor values. In an embodiment, risk sub-factors such as developer ID and overlap of project changes in the build requests (i.e., a relationship between project changes) may be selected for determining overall risk factor values when relatively large numbers of build requests are queued.

The number of pending build requests that trigger the use of a given subset of risk sub-factors may be automatically and/or dynamically determined by build manager 208, build queue 400, queue optimizer logic 210, and/or risk factor logic 214, or may be set by an administrator or developer associated with system 200. In embodiments, the use of risk sub-factor subsets may be triggered on reaching and/or exceeding a given threshold that is set or is predetermined prior to determining risk factors and generating request sets as described herein.

In step 604, a value is assigned to each of the one or more sub-factors. As an example, risk factor logic 214 is configured to determine a relationship between changed content in build requests (e.g., changes reside in different project directories or in the same directories, etc.). A build request or build requests that include(s) project changes which overlap, e.g., changes to the same file, changes to files or content in the same project directory, changes to files or content in the same portion of a project, etc., may be determined by risk factor logic 214 as being a higher risk than project changes in one or more build requests without overlap.

Risk factor logic 214 is also configured to retrieve information about a developer based on the developer name from repository 220, memory 206, or a storage otherwise accessible by risk factor logic 214. Developer information may include aspects such as historical information like developer experience, a number or ratio of successfully completed build requests, a risk value tag assigned to the developer or other competence indicator, etc., e.g., a developer reputation.

Risk factor logic 214 is also configured to determine a base commit of the change for a project and changed file types (e.g., stable base commits may be determined as a lower risk than new or unstable base commits), to retrieve changed files (e.g., specific files may be flagged as higher risk due to factors such as importance to the project, complexity, size, type (e.g., a change to source code has a higher risk than a change to a media file)), to determine an amount of code churn of the change for a project for individual build requests or groups of build requests (e.g., how much of the project is being changed or added to), should such information not be provided to risk factor logic 214 by queue optimizer logic 210 in step 504.

Risk factor logic 214 is also configured to determine a number of times within a given time period (e.g., hours, days, weeks, months, project lifetime, and/or the like) in which a given change is made. For instance, a source code file may be submitted with a specific change in change requests multiple times in a week from one or more developers. In such a case, the risk factor determined by risk factor logic 214 for this specific change may increase with each change request submitted to build queue 400. Additionally, risk factor logic 214 may account for a number of unsuccessful build completions for the same change in determining an associated risk factor.

In embodiments as described above, any number (e.g., one or more) of the sub-factors/individual factors noted above that are determined by risk factor logic 214 may be used to determine an overall risk factor for a given build request. In determining an overall risk factor for a given build request, risk values may be assigned to any number of determined/selected risk sub-factors noted herein, which may then be summed or otherwise utilized to determine a final, overall risk factor value. Risk factor logic 214 is also configured to weight any factor more or less than other factors in determining the overall risk factor.

The determined overall risk factor values from step 306 of flowchart 300 for build requests that are identified in step 504 of flow diagram 500 are then provided to queue optimizer logic 210 from risk factor logic 214 in step 506 of flow diagram 500.

Referring again to flowchart 300, in step 308, a request set comprising one or more of the first build request and the second build request is generated based on the risk factor. For instance, subset logic 216 is configured to generate request sets that include one or more build requests based on risk factors determined by risk factor logic 214, as described above. In step 508 of flow diagram 500 in FIG. 5, queue optimizer logic 210 provides the determined risk factors of build requests to subset logic 216. In the context of the example in step 304 of flowchart 300, one or more of the first build request (e.g., build request 404 in build queue 400) and the second build request (e.g., build request 406 in build queue 400) are used to generated a request set, although in embodiments, more build requests may be merged into any given request set.

For example, also referring again to flowchart 600, in step 606, the first build request and the second build request are included in the generated request set based on a comparison of a sum of the value of each of the one or more sub-factors to a threshold value. Subset logic 216 is configured to utilize the determined risk factor values and/or risk sub-factor values from risk factor logic 214 to determine if a given build request should be included or excluded from a generated request set. For example, overall risk factor values for build requests may be compared to a risk threshold value (e.g., as being less than, less than or equal to, equal to, greater than or equal to, or greater than), and/or may be compared to any risk values for other build requests to determine if a given build request is to be included in a request set or excluded therefrom. If the risk factor values for the first build request (e.g., build request 404 in build queue 400) and the second build request (e.g., build request 406 in build queue 400) satisfy the required comparison condition with respect to the risk threshold value, these build requests are included in the request set as generated by subset logic 216 which acts as a superset build request. Information associated with the generated request set is then provided to queue optimizer logic 210 from subset logic 216 as shown in step 510 of flow diagram 500.

Taking the example scenario of the first build request (e.g., build request 404 in build queue 400) and the second build request (e.g., build request 406 in build queue 400) even further, assume an example case where build request 410 and build request 412 in build queue 400 are also considered and determined for merging into the request set according to the steps of flowchart 300 and the associated disclosure. In this extended example scenario, subset logic 216 may be configured to determine to exclude build request 408 from the request set, e.g., due to determined risk sub-factors and/or an overall risk factor for build request 408, as described herein.

For instance, in FIG. 7 a build queue 700 with build requests and a request set is shown, according to an example embodiment. Build queue 700 is a further embodiment of build queue 400 of FIG. 4. That is, build queue 700 includes build request 402 (that is currently running) and also the pending build requests: build request 404, build request 406, build request 408, build request 410, and build request 412. In addition, build queue 700 also includes a request set 702 generated by subset logic 216.

Referring again to flowchart 300, in step 310, the request set is provided to the build queue as a third build request to be pending in the build queue. For example, queue optimizer logic 210 is configured to provide request set 702 to a build queue, as illustrated in step 512 of flow diagram 500. In this scenario, request set 702 is provided from optimizer logic 210 to build queue 700 (which is illustrated as a further embodiment of build queue 400 having request set 702 pending therein). Request set 702 as generated by subset logic 216 includes build request IDs 2, 3, 5, and, 6, which respectively correspond to pending build requests: build request 404, build request 406, build request 410, and build request 412. In this extended example scenario, request set 702 is generated by subset logic 216 according to the preceding steps of flowchart 300 and the associated description therefor, for build request 404, build request 406, build request 410, and build request 412.

In step 312, the request set is ordered in the build queue ahead of pending build requests included in the request set. As illustrated in build queue 700 of FIG. 7, subsequent to being received, request set 702 is inserted in build queue 700 as a pending build request ahead of pending build requests included in request set 702, i.e., ahead of build request 404, build request 406, build request 410, and build request 412. It should be noted that in the illustrated embodiments of FIG. 7, each of build request 404, build request 406, build request 410, and build request 412 remain pending in build queue 700 in their original, relative order, and after request set 702.

Request set 702 may include one or more of an ID, a status, a developer name, and a priority, as similarly described above with respect to build requests. As shown, and according to an embodiment, a request set such as request set 702 may have a unique ID and developer name to distinguish it as a request set: an ID that includes IDs of build requests included therein (e.g., 2, 3, 5, 6), and a developer name of "System," although the illustrated ID and developer name are exemplary in nature and not to be considered limiting, and other forms of ID and developer name for request sets are contemplated herein.

As illustrated, build request 402 is being processed (i.e., the build status is "running") in build queue 700 while request set 702 is pending at the head of build queue 700. On completion of processing, build request 402 is removed from build queue 700, and as request set 702 is the next pending request, request set 702 is then processed.

Referring again to FIG. 2, UI 224 of system 200 is configured to provide a visual representation of build queues, such as build queue 400 and/or build queue 700, that allows developers to submit build requests, view a build request and/or request set status, and otherwise interact with build queues as described herein. In embodiments, UI 224 may provide an option selectable by a developer requestor to prevent a build request of the developer requestor from being merged with other build requests. For instance, if a developer chooses to have a build request be processed without merging, e.g., if the developer is working with high-risk code or notes other high-risk code in pending build requests in a build queue, a "no merge" option, switch, etc., in UI 224 may be selected when the build request is submitted.

Figures 8, 9:
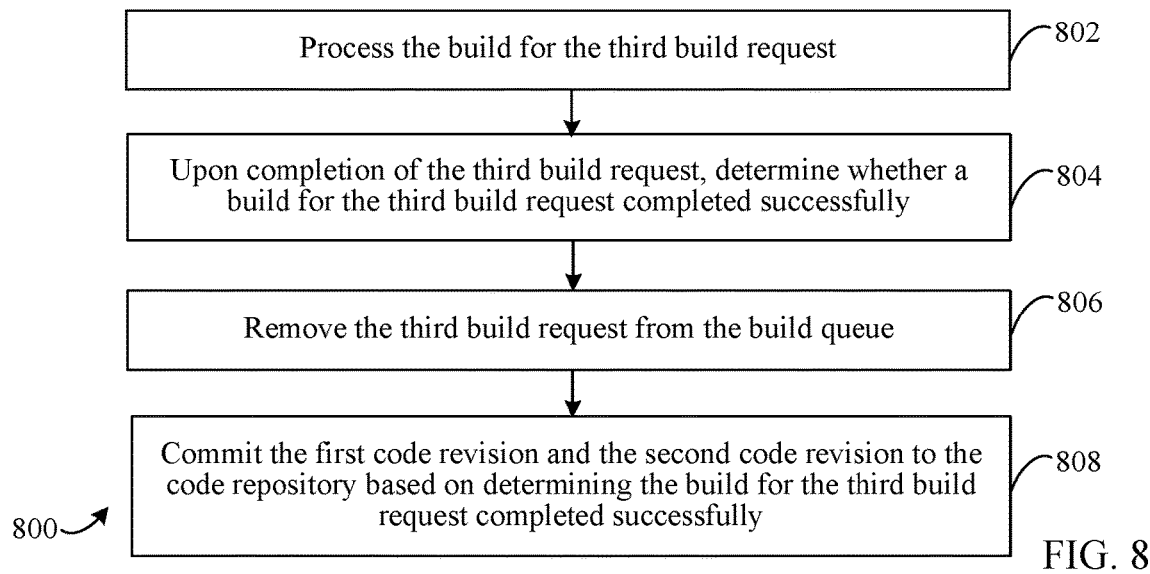
FIG. 8 shows a flowchart for intelligently and automatically merging source control queue items, according to an example embodiment.
FIG. 9 shows build queues with build requests including a merged build request, according to an example embodiment.

In FIG. 8, a flowchart 800 for intelligently and automatically merging source control queue items is shown, according to an example embodiment. For purposes of illustration, flowchart 800 of FIG. 8 is described with respect to system 200 of FIG. 2 and its subcomponents, and also with reference to FIG. 7. That is, host server 200 of FIG. 2, and one or more of its subcomponents, may perform various functions and operations in accordance with flowchart 800 for processing merged source control queue items, e.g., a request set, in build queue 700 of FIG. 7. Further structural and operational examples will be apparent to persons skilled in the relevant art(s) based on the following description. Flowchart 800 is described as follows.

In step 802, the build for the third build request is processed. Build manager 208 may be configured to process builds for build requests and/or request sets. For instance, the third build request, e.g., request set 702 as shown in build queue 700, may be processed subsequent to completion of build request 402.

In FIG. 9, build queues 900 with build requests including a merged build request are shown, according to an example embodiment. Build queues 900 of FIG. 9 include a build queue 902, a build queue 904, and a build queue 906, each of which may be a further embodiment of build queue 700 of FIG. 7.

As illustrated in build queue 902, request set 702 is being processed by build manager 208 (i.e., request set 702 has a status of "running"). That is, each build request that has been merged into request set 702 is processed together with each other build request merged into request set 702 effectively as a single build request in the form of request set 702.

In step 804, upon completion of the third build request, it is determined whether a build for the third build request completed successfully. When a build request such as build request 402 or a request set such as request set 702 completes its processing, UI 224 is configured to provide an indication of whether the builds are successfully completed or not successfully completed in build queue 700, which is reflected in build queue 904 of FIG. 9. That is, UI 224 provides a visual indication of a completion status 908 for the result of the processed build in build queue 700. The indication of completion status 908 may be any type of indication, e.g., such as a pass/fail text indication, a color highlight, and/or the like.

In step 806, the third build request is removed from the build queue. For example, build queue 700 is configured to remove a build request and/or a request subset from build queue 700 after processing of its build is complete, whether successfully or unsuccessfully completed. As is reflected in build queue 906 of FIG. 9, and according an embodiment, when the build for a request completes successfully, each build request that was merged into a request set, e.g., each of build request 404, build request 406, build request 410, and build request 412 that were merged to generate request set 702, may also be individually removed from build queue 700. As also shown in build queue 906, build request 408, which was not included in request set 702, as described above, would be the next build request at the head of build queue 906 after the individual build requests that were merged and request set 702 are remove, and build request 408 is then processed.

In step 808, the first code revision and the second code revision are committed to the code repository based on determining the build for the third build request completed successfully. For instance, as noted above in step 304 of flowchart 300 in FIG. 3, a first build request (i.e., build request 204) for a build of a first code revision and a second build request (i.e., build request 206) for a build of a second code revision are received in the build queue associated with code repository 220. In the context of request set 702, if it is determined that the build for request set 702, that includes build request 204 and build request 206, completes successfully, a build queue of build manager 208, e.g., build queue 400, build queue 700, and/or build queues 900, is configured to commit the revisions/additions in build request 204 and build request 206 to code repository 220, along with the revisions/additions in each other build request of request set 702.

That is, if a build for a build request or a request set is completed successfully, project content associated with the build request or request set, e.g., source code, design code, media/multimedia, libraries, etc., is committed to code repository 220 by the build queues described herein, although other components of system 200 and/or build manager 208 may also, or alternatively, be configured to perform the commit of the revisions/additions to code repository 220.

As described in the follow subsection, when builds for request sets are not successfully completed, further action may be taken by system 200.

B. Example Error Handling Embodiments

As previously noted, systems and devices may be enabled in various ways for intelligent and automatic merging of source control queue items according to embodiments. For example, system 200 of FIG. 2 may be configured to perform error handling operations for request sets, e.g., request set 702 described above, when a build for a request set does not complete successfully. That is, when one or more build requests that are merged into a request set for processing as a single, merged build request, contain errors or other characteristics that prevent successful completion of a build, the entire build for the request set will fail, i.e., not complete successfully.

Referring to system 200 of FIG. 2, error handling logic 212 may be configured to perform some or all of these error handling operations alone or in conjunction with other subcomponents of system 200.

In FIG. 10, a flowchart 1000 for intelligently and automatically merging source control queue items is shown, according to an example embodiment. For purposes of illustration, flowchart 1000 of FIG. 10 is described with respect to system 200 of FIG. 2 and its subcomponents, and also with reference to FIGS. 7 and 8. That is, host server 200 of FIG. 2, and one or more of its subcomponents including error handling logic 212, may perform various functions and operations in accordance with flowchart 1000 for processing merged source control queue items, e.g., a request set, in build queue 700 of FIG. 7. In some embodiments, flowchart 1000 is an alternative embodiment of flowchart 800 of FIG. 8. For instance, flowchart 1000 may replace step 808 of flowchart 800 when a build of a request set does not compete successfully. Further structural and operational examples will be apparent to persons skilled in the relevant art(s) based on the following description. Flowchart 1000 is described as follows.

In step 1002, at least one possible point of failure for a build of the request set is determined based on a received completion indication of the build of the request set. Error handling logic 212 may be configured to determine possible points of failure for builds of request sets and request subsets for unsuccessful builds thereof. For example, when a build for a request set, such as request set 702 of FIG. 7, does not complete successfully, an indication of the unsuccessful completion may be provided by build queue 700 to queue optimizer logic 210 as shown in step 514 of flow diagram 500 in FIG. 5. Queue optimizer logic 210 is configured to provide the indication to error handling logic 212 as shown in step 516 of flow diagram 500 for processing. Alternatively, a completion indication may be provided from which error handling logic 212 determines that the completion was unsuccessful. The indication of the unsuccessful completion may include request set information, e.g., information related to the build requests in the request set as described herein, as well as information associated with the unsuccessful completion of the build.

Error handling logic 212 may be configured to utilize the information associated with the unsuccessful completion of the request set build in determining optimizing information for how to optimize a failed request set into request subsets. For instance, if the information associated with the unsuccessful completion of the request set build includes indicia of failures or issues with a specific build request or build requests in the request set (e.g., project changes included therein), error handling logic 212 is configured to determine one or more of the build requests at issue by, e.g., determining compilation issues or runtime issues, determining a project change in a build that was in focus during a critical failure of the build, etc., determining specific project changes causing failures/errors in the build requests at issue, determining other build requests that may be at risk of failure due to the project changes of another build request that is causing failures, determining improperly formatted content of a project change, and/or the like. In embodiments, error handling logic 212 is configured to make such determinations based on error codes from the builds, output or log files from the builds, and/or other indicia of errors/issues with project changes in builds as would be apparent to a person of skill in the relevant art(s) having the benefit of this disclosure.

In some embodiments, the optimizing information associated with the unsuccessful completion of the build for the request set determined/generated by error handling logic 212 may be provided for use to risk factor logic 214 to dynamically and automatically update risk factors which may in turn be used by subset logic 212 to recursively divide the request set into request subsets, as similarly described above for forming request sets in flowchart 300 of FIG. 3, until individual build requests remain. As an example error scenario, if a build of request set 702 does not complete successfully, error handling logic 212 is configured to determine at least one cause of the unsuccessful completion of the build, e.g., at least one point of failure, by identifying an error in the build associated with a project change in a particular build request. For instance, error handling logic 212 may determine that build request 406 (with ID '3') of FIG. 4 would not compile properly for the build or that during the build a project change of build request 406 did provide an expected output that caused a cascade of subsequent failures or errors in the build. In this case, error handling logic 212 may identify the project changes in build request 406 as a possible point of failure and provide this information to risk factor logic 214 via queue optimizer logic 210 as shown in step 518 of flow diagram 500 and repeating step 504.

In another example error scenario, error handling logic 212 may determine that a project change of build request 410 (with ID '5') of FIG. 4 caused an error for an unexpected data type of a variable having data received from a project change in build request 406. In this case, error handling logic 212 may identify both project changes in build request 410 and build request 406 as possible points of failure and provide this information to risk factor logic 214 via queue optimizer logic 210 as shown in step 518 of flow diagram 500 and repeating step 504.

In step 1004, a first request subset comprising less than all build requests in the request subset is generated based on an updated risk factor. As noted above in step 1002, error handling logic 212 provides information for dynamically updating risk factors of build requests included in a request set subsequent to detecting an unsuccessful build of the request set. Risk factor logic 214 is configured to dynamically update one or more of these risk factors using the provided information and then provide the dynamic updates to queue optimizer logic 210 as similarly described above with respect to step 506 of flow diagram 500 which in turn provides the dynamic updates to subset logic 216 as similarly described above with respect to step 508. Subset logic 216 is configured to form request subsets using the build requests in the request set that failed to build and the updated risk factor values, as similarly described above in step 308 of flowchart 300 in FIG. 3 in the context of forming the request set. That is, a request subset may be conceptualized as a smaller request set formed from a larger request set.

For instance, in FIG. 11, a flowchart 1100 for intelligently and automatically merging source control queue items is shown, according to an example embodiment. For purposes of illustration, flowchart 1100 of FIG. 11 is described with respect to system 200 of FIG. 2 and its subcomponents, and also with reference to FIGS. 7 and 8. In embodiments, flowchart 1100 is a further embodiment of step 1004 of flowchart 1000. Further structural and operational examples will be apparent to persons skilled in the relevant art(s) based on the following description. Flowchart 1100 is described as follows.

In step 1102, the build requests in the request set are divided into approximately equal first and second groups, the first group comprising build requests with risk factor values that are less than risk factor values of build requests of the second group. In embodiments, subsequent to risk factor logic 214 dynamically updating risk factor values based on information from error handling logic 212, as described in step 1002, subset logic 216 is configured to recursively divide the request set, e.g., request set 702, into request subsets for subsequent processing until individual build requests remain. For request sets with an even number of build requests, the first and second groups may each have a number of build requests therein that is half of the number of build requests in the request set, while for request sets with an odd number of build requests, one of the first or second groups may include the remaining build request after two equal groups are generated.

Subset logic 212 may be configured to utilize updated and/or non-updated risk factors and sub-factors from risk factor logic 214 in determining how to divide the request set into request subsets, according to embodiments. For example, subset logic 212 may divide build requests from a request set into groups that have approximately equal overall risk factor values, or may divide build requests from a request set into groups where the first group contains build requests with the lowest overall total risk factor values and where the second group contains build requests with the highest overall total risk factor values. In the latter case, subset logic 212 may divide the build requests of the request set such that higher risk build requests are grouped with build requests having possible reasons for failure, i.e., an updated, higher risk factor.

In step 1104, the build requests of the first group are assigned to the first request subset. For instance, subset logic 212 is configured to assign a number of the divided build requests in the first group to a first request subset. Like the description above for generating request sets, the first request subset is assigned a developer of 'System' and an ID that includes the build requests in the first subset, as described in further detail below.

Referring again to flowchart 1000 of FIG. 10, in step 1006, a second request subset comprising any remaining build requests in the request sub that are not included in the first request subset is generated. For instance, subset logic 212 is configured to assign the remaining number of the divided build requests that are in the second group to a second request subset. Again, like the description above for generating request sets, the second request subset is assigned a developer of 'System' and an ID that includes the build requests in the first subset, as described in further detail below.

In step 1008, the first request subset and the second request subset are provided in the build queue ahead of the first build request, the second build request, and the third build request. For example, subset logic 216 is configured to provide the first and second subsets to queue optimizer logic 210 as similarly described above for request sets in step 510 of flow diagram 500 in FIG. 5. Queue optimizer logic 210 is configured to provide the first and second requests sets to a build queue of build queue logic 222 at step 520 of flow diagram 500.

In FIG. 12, a build queue 1200 with build requests and request subsets is shown, according to an example embodiment. Build queue 1200 of FIG. 12 includes a request subset 1202 and a request subset 1202. Build queue 1200 may be a further embodiment of build queue 700 of FIG. 7 and/or build queues 900 of FIG. 9.

For instance, as illustrated, build queue 1200 includes the pending build requests: build request 404, build request 406, build request 408, build request 410, and build request 412, as also shown in build queue 700 of FIG. 7, and build queues 902 and 904 of FIG. 9. In an alternate embodiment to that described above for build queue 904, if it is determined that request set 702 did not complete successfully (e.g., as in step 804 of flowchart 800 in FIG. 8), and subsequent to the preceding steps of flowchart 1000 described above, the first request subset (i.e., request subset 1202) and the second request subset (i.e., request subset 1204), are provided in build queue 1200, as pending, ahead of the build requests included in the first and second request subsets. It should also be noted that the build requests included in the first and second request subsets also remain pending in build queue 1200 in their original, relative locations.

In step 1010, the build for the first request subset is processed. For example, build manager 208 may be configured to cause execution, e.g., on processor 204, of the build for request subset 1202 which is pending highest in build queue 1200, while request subset 1204 remains pending below request subset 1202, and the status of request subset 1202 will be changed to 'running' in build queue 1200.

Figures 13, 14:
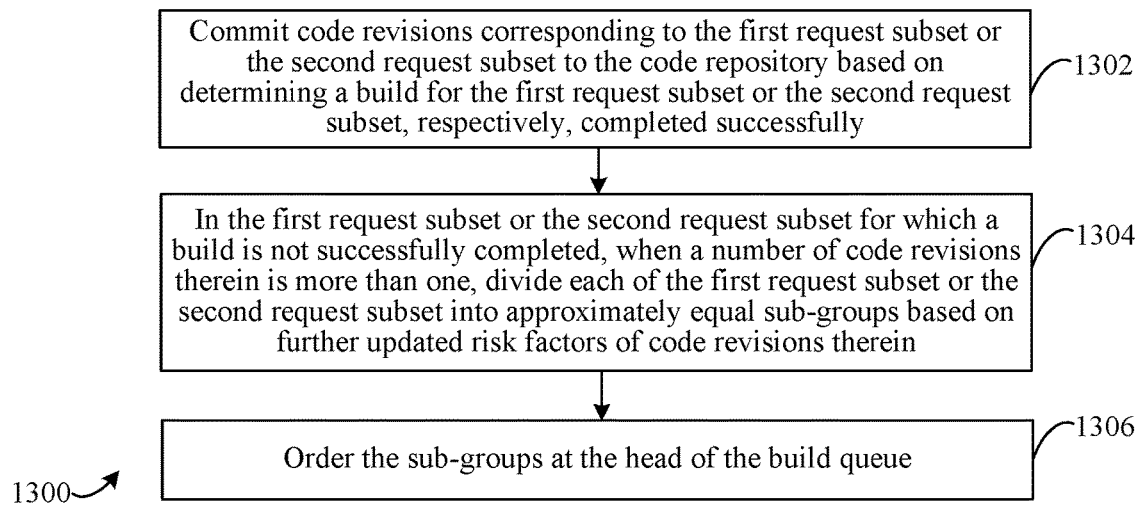
FIG. 13 shows a flowchart for intelligently and automatically merging source control queue items, according to an example embodiment.
FIG. 14 shows build queues with build requests including a merged build request, according to an example embodiment.

In FIG. 13, a flowchart 1300 for intelligently and automatically merging source control queue items is shown, according to an example embodiment. For purposes of illustration, flowchart 1300 of FIG. 13 is described with respect to system 200 of FIG. 2 and its subcomponents, and also with reference to FIGS. 12 and 13. That is, host server 200 of FIG. 2, and one or more of its subcomponents, may perform various functions and operations in accordance with flowchart 1300 for processing merged source control queue items. In some embodiments, flowchart 1300 is a further embodiment of flowchart 800 of FIG. 8 and/or flowchart 1000 of FIG. 10. Further structural and operational examples will be apparent to persons skilled in the relevant art(s) based on the following description. Flowchart 1300 is described as follows.

In step 1302, code revisions corresponding to the first request subset or the second request subset to the code repository are committed based on determining a build for the first request subset or the second request subset, respectively, completed successfully. For example, as similarly described above with respect to committing project changes in request sets for which a successful build completes in step 808 of flowchart 800 in FIG. 8, project changes in build requests that are included in a request subset are committed, e.g., to code repository 220, when a build for the request subset completes successfully. A request subset for which a build completes successfully is also removed from the build queue along with individual build requests that are included in the request subset.

For instance, FIG. 14 shows build queues 1400 with build requests including a request subset, according to an example embodiment. Build queues 1400 of FIG. 14 include a build queue 1402 and a build queue 1404, each of which may be a further embodiment of build queue 700 of FIG. 7, build queues 900 of FIG. 9, and/or build queue 1200 of FIG. 12. The embodiments depicted in build queues 1400 will be described in the context of build queue 1200 for illustration.

Build queue 1402 shows a representation of build queue 1200 after the build for request subset 1202 has completed successfully where the build for request subset 1202 has been removed from the build queue and the project changes included therein have been committed. Additionally, the individual entries in the build queue for build request 404 and build request 410, which were included in request subset 1202, have been removed. Request subset 1204 is pending at the head of the queue after the removal of request subset 1202, and the build for request subset 1204 is then performed In step 1304, in the first request subset or the second request subset for which a build is not successfully completed, when a number of code revisions therein is more than one, each of the first request subset or the second request subset are divided into approximately equal sub-groups, i.e., additional request subsets, based on further updated risk factors of code revisions therein. For instance, as similarly described above with respect to generating request sets and request subsets, when a build for a request subset that does not successfully complete, the request subset is further divided into sub-groups of build requests (e.g., through recursive, binary division). Error handling logic 212 is configured to determine further possible points of failure for builds of request subsets in a similar manner as described above for request sets in flowchart 1000 of FIG. 10 to be used by risk factor logic 214 to further update risk factor values for build requests. It should be noted that in determining further possible points of failure for builds of request subsets, error handling logic 212 may perform such a function and not find further indicia of failures or errors and may provide information to this effect to risk factor logic 214. However, even in such cases, the risk factor values are considered to be further updated by virtue of performing the process to make such a determination, according to embodiments.

As an example, a request subset with four build requests would be divided into two sub-groups that each include two build requests based on possible points of failure in the build of the request subset as determined by error handling logic 212 and utilized by risk factor logic 214 and subset logic 216, as described herein. As illustrated in the example embodiment in build queues 1400, request subset 1204 includes two build requests (i.e., build request 406 and build request 412), which are divided into equal sub-groups (i.e., sub-groups including one build request) for processing, as shown in build queue 1404, after determining that the build for request subset 1204 did not successfully complete. A request subset for which a build does not complete successfully, e.g., request subset 1204, is also removed from the build queue as shown in build queue 1404.

In step 1306, the sub-groups are provided at the head of the build queue. For instance, in the example embodiment described with respect to step 1304 for a request subset including four build requests, the generated sub-groups would be provided at the head of the build queue for processing, before the build requests included therein, as described herein with respect to the insertion of request subsets in flowchart 1000 of FIG. 10 for build queue 1200 of FIG. 12. In the illustrated embodiment of build queue 1404 having single-build request sub-groups, build request 406 and build request 412 remain in their original positions in the build queue. In such cases, the maintaining of build queue position is considered equivalent to being at the head of the build queue.

Figure 15:
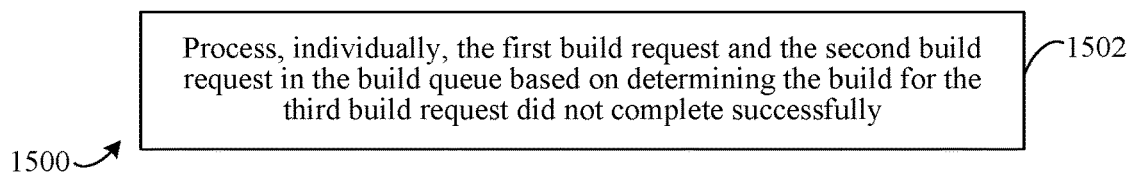
FIG. 15 shows a flowchart for intelligently and automatically merging source control queue items, according to an example embodiment.

In FIG. 15, a flowchart 1500 for intelligently and automatically merging source control queue items is shown, according to an example embodiment. For purposes of illustration, flowchart 1500 of FIG. 15 is described with respect to system 200 of FIG. 2 and its subcomponents, and also with reference to FIGS. 13 and 14. That is, host server 200 of FIG. 2, and one or more of its subcomponents, may perform various functions and operations in accordance with flowchart 1500 for processing merged source control queue items. In some examples, flowchart 1500 is a further embodiment of flowchart 300 of FIG. 3 and/or flowchart 1300 of FIG. 13. Further structural and operational examples will be apparent to persons skilled in the relevant art(s) based on the following description. Flowchart 1500 is described as follows.

In step 1502, the first build request and the second build request in the build queue are processed, individually, based on determining the build for the third build request did not complete successfully. For instance, as shown in build queue 1404, if a build for a request subset that includes two build requests does not complete successfully, the two build requests in the request subset are then processed individually to determine if one or both are root causes for the build failure. This process analogously applies to request sets having two build requests (e.g., as in an embodiment of flowchart 300 in FIG. 3) as well as sub-groups having two build requests.

Accordingly, these techniques and embodiments provide for intelligent and automatic merging for source control queue item error handling that will deal with at most O(log n) failures based on performing, or approximately performing, binary searches for the error handling process, thus increasing queue efficiency and throughput, as well as minimizing the overhead of failures, e.g., memory and processing requirements for unsuccessful build completions, including a decrease in memory footprint.

Furthermore, error handling logic 212 may be customized to handle unsuccessful builds on a project-by-project basis for specific design projects by one or more of developers, project managers, system administrators, etc., such that error handling logic 212 provides error handling information to risk factor logic 214 in a way that meets the goals, nuances, and/or requirements of any given project according to the described embodiments and techniques.

III. Example Cloud-Based Learning Embodiments

The described embodiments and techniques also provide for updating the risk factor determination using cloud-based machine learning. For example, a cloud-based machine learning algorithm executing on a cloud-based server may receive build results from any number of related and/or unrelated projects, according to embodiments. This received build information may be used to determine more efficient risk factor values by risk factor logic 214, as described above.

Figure 16:
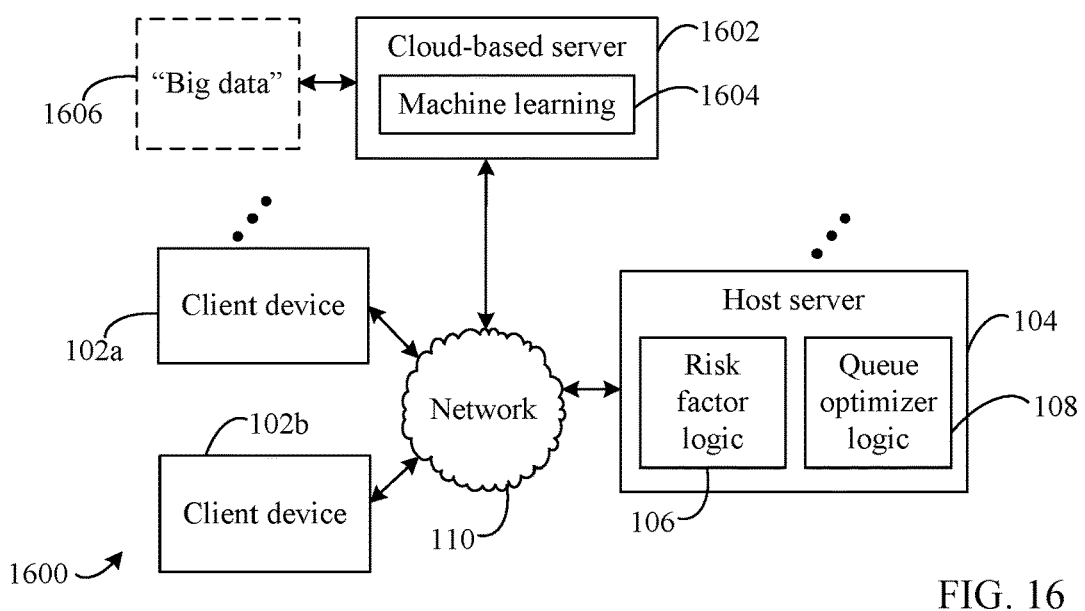
FIG. 16 shows a block diagram of a system for cloud-based learning for risk assessments, according to an example embodiment.

FIG. 16 shows a block diagram of a system 1600 for cloud-based learning for risk assessments, according to an example embodiment. As illustrated, system 1600 is a further embodiment of system 100 of FIG. 1. In addition, system 1600 may include a plurality of host servers 104 having respective pluralities of associated client devices 102a, 102b, etc., that may be used by different business entities, different groups within a business entity, and/or the like. System 1600 also includes a cloud-based server 1602 which may be any type of server computer, including distributed server system, according to embodiments.

Cloud-based server 1602 includes machine learning logic 1604 configured to receive build results from any number of related and/or unrelated projects utilizing the embodiments and techniques described herein with the host server(s) and client devices shown in FIG. 16. In embodiments, cloud-based server 1602 may be communicatively coupled to a "big data" system database 1606 on which machine learning logic 1604 operates. Big data system database 1606 may reside inside or outside of the cloud in embodiments, and may be centralized or distributed. Cloud-based server 1602 may be communicatively coupled to host sever 104 via network 110, and may reside "in the cloud" as would be understood by one of skill in the relevant art(s) having the benefit of this disclosure.

Figure 17:
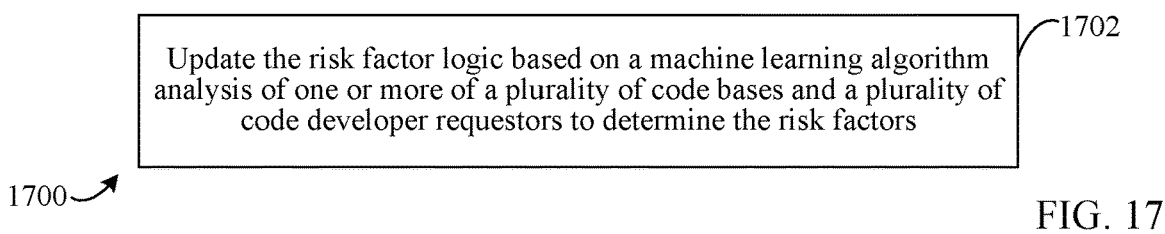
FIG. 17 shows a flowchart for cloud-based learning for risk assessments, according to an example embodiment.

FIG. 17 shows a flowchart 1700 for cloud-based learning for risk assessments, according to an example embodiment. For purposes of illustration, flowchart 1700 of FIG. 17 is described with respect to system 1600 of FIG. 16 and its subcomponents, such as machine learning logic 1604 and risk factor logic 106. That is, cloud-based server 1602 of FIG. 16, and one or more of its subcomponents, may perform various functions and operations in accordance with flowchart 1700 for machine learning and optimization of risk factor determinations. Further structural and operational examples will be apparent to persons skilled in the relevant art(s) based on the following description. Flowchart 1700 is described as follows.

In step 1702, the risk factor logic is updated based on a machine learning algorithm analysis of one or more of a plurality of code bases and a plurality of code developer requestors to determine the risk factors. For example, risk factor logic 106 may be updated to more efficiently and/or effectively determine risk factors for build requests by cloud-based server 1602 using machine learning logic 1604. Machine learning logic 1604 is configured to compile historical information related to processed build requests to determine patterns and/or likelihoods of risks associated therewith. For example, machine learning logic 1604 may determine that certain types of files or portions thereof, including functions, structures, etc., frequently exhibit certain risk characteristics across a number of related and/or unrelated projects and/or code bases on different host servers 104. Similarly, information compiled on developers with similar traits/characteristics may be utilized by machine learning logic 1604 to determine certain risk characteristics. These risk characteristics determined by machine learning logic 1604 may be provided to risk factor logic 106 via network 110 to update risk factor logic 106.

IV. Example Processor-Based Computer System Implementation

The embodiments and techniques described herein may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC). An SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 18:
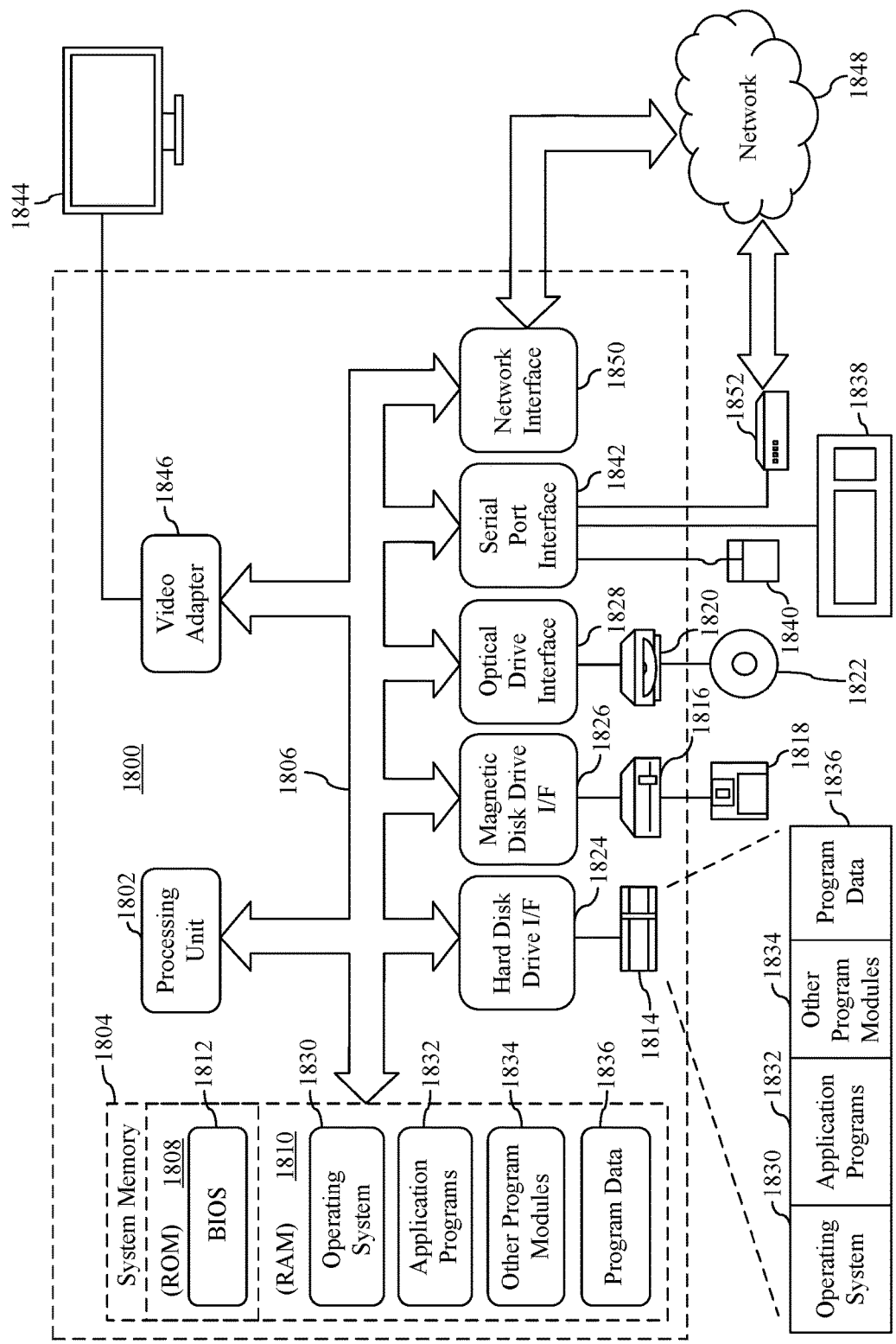
FIG. 18 shows a block diagram of an example processor-based computer system that may be used to implement various example embodiments.

FIG. 18 depicts an example processor-based computer system 1800 that may be used to implement various examples described herein. For example, system 1800 may be used to implement any server, host, system, client, device, etc., as described herein. System 1800 may also be used to implement any of the steps of any of the flowcharts, as described herein. The description of system 1800 provided herein is provided for purposes of illustration, and is not intended to be limiting. Examples may be implemented in further types of computer systems, as would be known to persons skilled in the relevant art(s).

As shown in FIG. 18, system 1800 includes a processing unit 1802, a system memory 1804, and a bus 1806 that couples various system components including system memory 1804 to processing unit 1802. Processing unit 1802 may comprise one or more circuits, microprocessors or microprocessor cores. Bus 1806 represents one or more of any of several types of bus structures, including a memory bus or memory controller, a peripheral bus, an accelerated graphics port, and a processor or local bus using any of a variety of bus architectures. System memory 1804 includes read only memory (ROM) 1808 and random access memory (RAM) 1810. A basic input/output system 1812 (BIOS) is stored in ROM 1808.

System 1800 also has one or more of the following drives: a hard disk drive 1814 for reading from and writing to a hard disk, a magnetic disk drive 1816 for reading from or writing to a removable magnetic disk 1818, and an optical disk drive 1820 for reading from or writing to a removable optical disk 1822 such as a CD ROM, DVD ROM, BLU-RAY™ disk or other optical media. Hard disk drive 1814, magnetic disk drive 1816, and optical disk drive 1820 are connected to bus 1806 by a hard disk drive interface 1824, a magnetic disk drive interface 1826, and an optical drive interface 1828, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 1830, one or more application programs 1832, other program modules 1834, and program data 1836. In accordance with various examples, the program modules may include computer program logic that is executable by processing unit 1802 to perform any or all of the functions and features of any technique or example described herein, including computer program logic. The program modules may also include computer program logic that, when executed by processing unit 1802, causes processing unit 1802 to perform any of the steps of any of the flowcharts, as described above.

A user may enter commands and information into system 1800 through input devices such as a keyboard 1838 and a pointing device 1840 (e.g., a mouse). Other input devices (not shown) may include a microphone, joystick, game controller, scanner, or the like. In one example, a touch screen is provided in conjunction with a display 1844 to allow a user to provide user input via the application of a touch (as by a finger or stylus for example) to one or more points on the touch screen. These and other input devices are often connected to processing unit 1802 through a serial port interface 1842 that is coupled to bus 1806, but may be connected by other interfaces, such as a parallel port, game port, or a universal serial bus (USB). Such interfaces may be wired or wireless interfaces.

Display 1844 is connected to bus 1806 via an interface, such as a video adapter 1846. In addition to display 1844, system 1800 may include other peripheral output devices (not shown) such as speakers and printers.

System 1800 is connected to a network 1848 (e.g., a local area network or wide area network such as the Internet) through a network interface 1850, a modem 1852, or other suitable means for establishing communications over the network. Modem 1852, which may be internal or external, is connected to bus 1806 via serial port interface 1842.

As used herein, the terms "computer program medium," "computer-readable medium," and/or "computer-readable storage medium" are used to generally refer to memory devices or storage structures such as the hard disk associated with hard disk drive 1814, removable magnetic disk 1818, removable optical disk 1822, as well as other memory devices or storage structures such as flash memory cards, digital video disks, random access memories (RAMs), read only memories (ROM), and the like. Such computer-readable media/storage media are distinguished from and non-overlapping with communication media, software programs, and transitory signals (do not include communication media, software programs, or transitory signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Examples are also directed to such communication media.

As noted above, computer programs and modules (including application programs 1832 and other program modules 1834) may be stored on the hard disk, magnetic disk, optical disk, ROM, or RAM. Such computer programs may also be received via network interface 1850, serial port interface 1842, or any other interface type. Such computer programs, when executed or loaded by an application, enable systems to implement features of examples discussed herein. Accordingly, such computer programs represent controllers of the system 18. Examples are also directed to computer program products comprising software stored on any computer useable medium. Such software, when executed in one or more data processing devices, causes a data processing device(s) to operate as described herein. Examples may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

V. Additional Advantages and Examples

Figure 19:
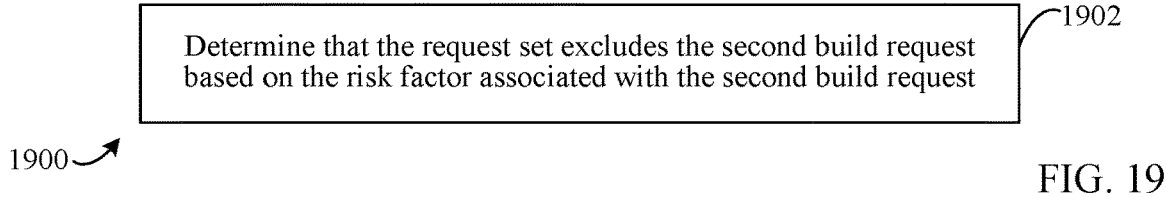
FIG. 19 shows a flowchart for intelligently and automatically merging source control queue items, according to an example embodiment.

FIG. 19 shows a flowchart 1900 for intelligently and automatically merging source control queue items, according to an example embodiment. For purposes of illustration, flowchart 1900 of FIG. 19 is described with respect to system 200 of FIG. 2 and its subcomponents, as well as build queue 700 of FIG. 7. That is, system 200 of FIG. 2, and one or more of its subcomponents, may perform various functions and operations in accordance with flowchart 1900 for intelligently and automatically merging source control queue items. Flowchart 1900 may be an alternative embodiment of flowchart 300 of FIG. 3 and/or of flowchart 600 of FIG. 6. Further structural and operational examples will be apparent to persons skilled in the relevant art(s) based on the following description. Flowchart 1900 is described as follows.

In step 1902, it is determined that the request set excludes the second build request based on the risk factor associated with the second build request. For example, as described with respect to steps 306 and 308 of flowchart 300 and with respect to flowchart 600, build requests are included in request sets based on risk factor values associated therewith. In step 606 of flowchart 600, a first and a second build request are included in the generated request set based on values associated with their risk factors. As shown in build queue 700 of FIG. 7 for request set 702 including four build requests, however, build request 408 is excluded from request set 702. In embodiments, subset logic 216 is configured to determine to exclude a build request from a request set based on its associated risk factor.

As described, systems and devices embodying the techniques herein may be configured in various ways to perform their respective functions. In embodiments, one or more of the steps or operations of any flowchart described herein may not be performed. Moreover, steps or operations in addition to or in lieu of those in any flowchart described herein may be performed. Further, in examples, one or more operations of any flowchart described herein may be performed out of order, in an alternate sequence, or partially (or completely) concurrently with each other or with other operations.

The embodiments and techniques described herein provide for improvements in operation of host servers and similar systems, such as those hosting gated check-in queue mechanisms. For instance, the described embodiments and techniques provide for increased efficiency in performing builds for projects at least in that multiple project changes for which a build completes successfully may be committed more quickly via the use of request sets and subsets as described herein. Additionally, determining root cause changes for build failures is also more efficiently performed using binary iteration for subset generation, as described herein. Furthermore, by utilizing the risk factors described herein for the selective generation of request sets and subsets, both times to commit for successful builds and root cause failure determination are improved in the systems. Accordingly, fewer processing cycles are required by the system in performing builds, and system memory is freed more quickly reducing the required memory footprint. Still further, project management is improved in such systems based on the efficiencies noted above which improve overall project progression times and reduce resource conflicts for developers to build and commit project changes.

The additional examples described in this Section may be applicable to examples disclosed in any other Section or subsection of this disclosure.

A method implemented in a client device is described herein. The method includes receiving, in a build queue associated with a code repository, a first build request for a build of a first code revision and a second build request for a build of a second code revision, and determining a risk factor associated with at least one of the first build request or the second build request. The method also includes generating a request set comprising one or more of the first build request and the second build request based on the risk factor, and inserting the request set into the build queue as a third build request to pend ahead of the first build request and the second build request.

In embodiments of the method, determining the risk factor comprises basing the risk factor on one or more sub-factors comprising at least one of a build request priority, a base commit identifier for a code change, an identity of a requestor for the first or second build request, a file type of a changed file for the first or second build request, an amount of code change in the first or second build request, or a relationship between a changed file in the first build request and a changed file in the second build request.

In embodiments, the method includes assigning a value to each of the one or more sub-factors, and including the first build request and the second build request in the generated request set based on a comparison of a sum of the value of each of the one or more sub-factors to a threshold value.

In embodiments of the method, the first build request and the second build request are included in the request set, and the first build request and the second build request remain in the build queue individually. In embodiments, the method includes upon completion of the third build request, determining whether a build for the third build request completed successfully, and removing the third build request from the build queue. In embodiments, the method includes subsequently performing one of committing the first code revision and the second code revision to the code repository based on determining the build for the third build request completed successfully, or processing, individually, the first build request and the second build request in the build queue based on determining the build for the third build request did not complete successfully.

In embodiments of the method, the request set also includes a fourth build request for a build of a third code revision that is in the build queue and has a respective risk factor. In embodiments, the method further comprises determining that a build for the third build request completed successfully, removing the third build request from the build queue, and committing the first code revision, the second code revision, and the third code revision to the code repository based on determining the build for the third build request completed successfully.

In embodiments of the method, the request set also includes a fourth build request for a build of a third code revision that is in the build queue, and the method further comprises determining a build for the third build request was not completed successfully, and removing the third build request from the build queue. In embodiments, the method also includes generating a first request subset comprising less than all build requests in the request set based on an updated risk factor, generating a second request subset comprising any remaining build requests in the request set that are not included in the first request subset, and providing the first request subset and the second request subset in the build queue ahead of the first build request, the second build request, and the third build request.

In embodiments of the method, generating the first request subset includes dividing the build requests in the request set into approximately equal first and second groups, the first group comprising build requests with risk factor values that are less than risk factor values of build requests of the second group, and assigning to the first request subset the build requests of the first group.

In embodiments, the method includes committing code revisions corresponding to the first request subset or the second request subset to the code repository based on determining a build for the first request subset or the second request subset, respectively, completed successfully. In embodiments, the method includes in the first request subset or the second request subset for which a build is not successfully completed, when a number of code revisions therein is more than one, dividing each of the first request subset or the second request subset into approximately equal sub-groups based on further updated risk factors of code revisions therein, and inserting the sub-groups at the head of the build queue.

A system is also described herein. The system includes at least one first memory device configured to store program instructions, at least one second memory device configured as a code repository, and at least one processor configured to execute the program instructions. The program instructions include build queue instructions configured to maintain a build queue to queue received build requests and request sets, the build queue being a gated check-in build queue for access to the code repository, to order the request sets in the build queue ahead of pending build requests included in the request sets, and to commit code revisions of the build requests and the request sets for which a build successfully completes. The program instructions also include risk factor instructions configured to determine risk factors of the build requests that are received by the system. The program instructions also include subset instructions configured to generate request sets, each comprising one or more build requests pending in the build queue that are merged to form the request sets, based on the risk factors. The program instructions also include queue optimizer instructions configured to insert the request sets into the build queue.

In embodiments of the system, the risk factor logic is configured to determine the risk factors based on values of one or more sub-factors that include at least one of a build request priority, a base commit identifier for a code change, an identity of a requestor for the first or second build request, a file type of a changed file for the first or second build request, an amount of code change in the first or second build request, or a relationship between a changed file in the first build request and a changed file in the second build request.

In embodiments of the system, the risk factor logic is configured to select sub-factors of the one or more sub-factors to determine the risk factors based on a number of build requests to be merged into a request set.

In embodiments of the system, the risk factor logic is configured to be updated based on a machine learning algorithm analysis of one or more of a plurality of code bases and a plurality of code developer requestors to determine the risk factors.

In embodiments, the system further includes error handling instructions configured to determine at least one possible point of failure for a build of the request set based on a received completion indication of the build of the request set. In embodiments of the system, wherein the risk factor instructions are further configured to determine an updated risk factor for a build request associated with the determined at least one possible point of failure, the subset instructions are further configured to divide a request set into two request subsets with an approximately equal number of build requests responsive to a build of the request set not successfully completing, the queue optimizer instructions are further configured to insert the request subsets to the build queue, and the build queue instructions are further configured to remove the request set from the build queue and to order the request subsets in the build queue ahead of build requests included in the request subsets that are also pending in the build queue.

In embodiments of the system, the queue optimizer instructions are further configured to divide a request subset into two additional request subsets, with an approximately equal number of build requests and based on risk factors of the build requests in the request subset, responsive to a build of the request subset not successfully completing, and insert the two additional request subsets to the build queue. In embodiments of the system, the build queue instructions are further configured to commit code revisions of the request subsets for which a build successfully completed, to remove the request subsets from the build queue subsequent to builds of the request subsets completing, and to order the two additional request subsets in the build queue ahead of pending build requests in the two additional request subsets.

In embodiments of the system, the program instructions further include user interface (UI) instructions configured to provide a UI for the build queue to one or more client devices of code developer requestors. In embodiments of the system, the UI provides at least one of a queue status of the build requests and the request sets in the build queue, a completion indication of builds the build requests and the request sets, or access to the one or more client devices of the code developer requestors for submitting respective build requests to the build queue.

A computer-readable storage device having program instructions recorded thereon that, when executed by one or more processors, cause the one or more processors to perform a method in a client device, is also described herein. The method includes receiving a first build request for a first code revision and a second build request for a second code revision in a build queue, and determining a risk factor associated with at least one of the first build request or the second build request. The method also includes generating a request set comprising one or more of the first build request and the second build request based on the risk factor associated with the at least one of the first build request or the second build request, and inserting the request set into the build queue as a third build request.

In embodiments of the method, determining the risk factor includes basing the risk factor on one or more sub-factors that include at least one of a build request priority, a base commit identifier for a code change, an identity of a requestor for the first or second build request, a file type of a changed file for the first or second build request, an amount of code change in the first or second build request, or a relationship between a changed file in the first build request and a changed file in the second build request.

In embodiments of the method, the first build request and the second build request are included in the request set, and the first build request and the second build request remain in the build queue individually. In embodiments, the method further includes upon completion of the third build request, determining whether a build for the third build request completed successfully, and removing the third build request from the build queue. In embodiments, the method further includes subsequently performing one of committing the first code revision and the second code revision to the code repository based on determining the build for the third build request completed successfully, or processing, individually, the first build request and the second build request in the build queue based on determining the build for the third build request did not complete successfully.

In embodiments, the method further includes determining that the request set excludes the second build request based on the risk factor associated with the second build request.

In embodiments of the method, the risk factor associated with the second build request includes a relationship between a changed file in the first build request and a changed file in the second build request each of which includes code changes to a common code component.

VI. Conclusion

While various examples of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described examples, but should be defined only in accordance with the following claims and their equivalents.

What is claimed is:

1. A computer-implemented method comprising:
   receiving, in a build queue associated with a code repository, a first build request for a build of a first code revision and a second build request for a build of a second code revision;
   determining a risk factor for at least one of the first build request or the second build request;
   generating a request set comprising one or more of a copy of the first build request and a copy of the second build request based on the risk factor; and
   inserting the request set into the build queue as a third build request to pend ahead of the first build request and the second build request.

2. The computer-implemented method of claim 1, wherein determining the risk factor comprises basing the risk factor on one or more sub-factors comprising at least one of:
   a build request priority;
   a base commit identifier for a code change;
   an identity of a requestor for the first build request or the second build request;
   a file type of a changed file for the first build request or the second build request;
   an amount of code change in the first build request or the second build request; or
   a relationship between a changed file in the first build request and a changed file in the second build request.

3. The computer-implemented method of claim 2, further comprising:
   assigning a value to each of the one or more sub-factors; and
   including the copy of the first build request and the copy of the second build request in the generated request set based on a comparison of a sum of the value of each of the one or more sub-factors to a threshold value.

4. The computer-implemented method of claim 1, wherein the copy of the first build request and the copy of the second build request are included in the request set, and the first build request and the second build request remain in the build queue individually;
   the method further comprising:
   upon completion of the third build request, determining whether a build for the third build request completed successfully; and
   removing the third build request from the build queue and subsequently performing one of:
      committing the first code revision and the second code revision to the code repository based on determining the build for the third build request completed successfully; or
      processing, individually, the first build request and the second build request in the build queue based on determining the build for the third build request did not complete successfully.

5. The computer-implemented method of claim 1, wherein the request set also includes a copy of a fourth build request for a build of a third code revision that is in the build queue and has a respective risk factor, the method further comprising:
   determining that a build for the third build request completed successfully;
   removing the third build request from the build queue; and
   committing the first code revision, the second code revision, and the third code revision to the code repository based on determining the build for the third build request completed successfully.

6. The computer-implemented method of claim 1, wherein the request set also includes a copy of a fourth build request for a build of a third code revision that is in the build queue, the method further comprising:
   determining a build for the third build request was not completed successfully;
   removing the third build request from the build queue;
   generating a first request subset comprising less than all copies of build requests in the request set based on an updated risk factor;
   generating a second request subset comprising any remaining copies of build requests in the request set that are not included in the first request subset; and
   providing the first request subset and the second request subset in the build queue ahead of the first build request, the second build request, and the third build request.

7. The computer-implemented method of claim 6, wherein generating the first request subset comprises:
   dividing the copies of build requests in the request set into approximately equal first and second groups, the first group comprising first copies of build requests with risk factor values that are less than risk factor values of second copies of build requests of the second group; and
   assigning to the first request subset the first copies of build requests of the first group.

8. The computer-implemented method of claim 6, further comprising:
   committing code revisions corresponding to the first request subset or the second request subset to the code repository based on determining a build for the first request subset or the second request subset, respectively, completed successfully;

in the first request subset or the second request subset for which a build is not successfully completed, when a number of code revisions therein is more than one, dividing each of the first request subset or the second request subset into approximately equal sub-groups based on further updated risk factors of code revisions therein; and inserting the sub-groups at the head of the build queue.

9. A system comprising:

at least one first memory device configured to store program instructions;

at least one second memory device configured as a code repository; and at least one processor configured to execute the program instructions, the program instructions including:

build queue instructions configured to:
maintain a build queue to queue received build requests and request sets, the build queue being a gated check-in build queue for access to the code repository;
order the request sets in the build queue ahead of pending build requests in the build queue that are also represented in the request sets; and
commit code revisions of the build requests and the request sets for which a build successfully completes;

risk factor instructions configured to:
determine risk factors of the build requests that are received by the system;

subset instructions configured to:
generate request sets, each comprising respective copies of one or more build requests pending in the build queue that are included to form the request sets, based on the risk factors; and queue optimizer instructions configured to:
insert the request sets into the build queue.

10. The system of claim 9, wherein the risk factor instructions are configured to determine the risk factors based on values of one or more sub-factors comprising at least one of:

a build request priority;
a base commit identifier for a code change;
an identity of a code developer requestor for the first build request or the second build request;
a file type of a changed file for the first build request or the second build request;
an amount of code change in the first build request or the second build request; or
a relationship between a changed file in the first build request and a changed file in the second build request.

11. The system of claim 10, wherein the risk factor instructions are configured to select sub-factors of the one or more sub-factors to determine the risk factors based on a number of build requests to be included in a request set.

12. The system of claim 9, wherein the risk factor instructions are configured to be updated based on a machine learning algorithm analysis of one or more of a plurality of code bases and a plurality of code developer requestors to determine the risk factors.

13. The system of claim 9, the system further comprising error handling instructions configured to:

determine at least one possible point of failure for a build of the request set based on a received completion indication of the build of the request set;

wherein the risk factor instructions are further configured to:
determine an updated risk factor for a build request associated with the determined at least one possible point of failure;

wherein the subset instructions are further configured to:
divide a request set into two request subsets with an approximately equal number of copies of build requests responsive to a build of the request set not successfully completing;

wherein the queue optimizer instructions are further configured to:
insert the request subsets to the build queue; and wherein the build queue instructions are further configured to:
remove the request set from the build queue; and
order the request subsets in the build queue ahead of build requests represented in the request subsets that are also pending in the build queue.

14. The system of claim 13, wherein the subset instructions are further configured to:

divide a request subset into two additional request subsets, with an approximately equal number of copies of build requests and based on risk factors of the build requests represented in the request subset, responsive to a build of the request subset not successfully completing;

wherein the queue optimizer instructions are further configured to:
insert the two additional request subsets to the build queue; and wherein the build queue instructions are further configured to:
commit code revisions of the request subsets for which a build successfully completed;
remove the request subsets from the build queue subsequent to builds of the request subsets completing; and
order the two additional request subsets in the build queue ahead of pending build requests represented in the two additional request subsets.

15. The system of claim 9, the program instructions further comprising:

user interface (UI) instructions configured to provide a UI for the build queue to one or more client devices of code developer requestors, the UI providing at least one of:

a queue status of the build requests and the request sets in the build queue;
a completion indication of builds of the build requests and the request sets;
access to the one or more client devices of the code developer requestors for submitting respective build requests to the build queue; or
an option selectable by a developer requestor to prevent a build request of the developer requestor from being included with other build requests.

16. A computer-readable storage medium having program instructions recorded thereon that, when executed by one or more processors, cause the one or more processors to perform a method in a client device, the method comprising:

receiving a first build request for a first code revision and a second build request for a second code revision in a build queue;

determining a risk factor for at least one of the first build request or the second build request;

generating a request set comprising one or more of a copy of the first build request and a copy of the second build request based on the risk factor for the at least one of the first build request or the second build request; and inserting the request set into the build queue as a third build request to pend ahead of the first build request and the second build request.

17. The computer-readable storage medium of claim 16, wherein determining the risk factor comprises basing the risk factor on one or more sub-factors comprising at least one of:

a build request priority;

a base commit identifier for a code change;

an identity of a requestor for the first build request or the second build request;

a file type of a changed file for the first build request or the second build request;

an amount of code change in the first build request or the second build request; or a relationship between a changed file in the first build request and a changed file in the second build request.

18. The computer-readable storage medium of claim 16, wherein the copy of the first build request and the copy of the second build request are included in the request set, and the first build request and the second build request remain in the build queue individually;

the method further comprising:

upon completion of the third build request, determining whether a build for the third build request completed successfully; and removing the third build request from the build queue and subsequently performing one of:

committing the first code revision and the second code revision to the code repository based on determining the build for the third build request completed successfully; or processing, individually, the first build request and the second build request in the build queue based on determining the build for the third build request did not complete successfully.

19. The computer-readable storage medium of claim 16, the method further comprising:

determining that the request set excludes the copy of the second build request based on the risk factor associated for the second build request.

20. The computer-readable storage medium of claim 19, wherein the risk factor for the second build request includes a relationship between a changed file in the first build request and a changed file in the second build request each of which includes code changes to a common code component.

* * * * *